US009805551B2

(12) United States Patent
Meyer et al.

(10) Patent No.: US 9,805,551 B2
(45) Date of Patent: Oct. 31, 2017

(54) ELECTRONIC GAMING MACHINE AND METHOD

(71) Applicant: Ainsworth Game Technology Limited, Newington (AU)

(72) Inventors: Jason Meyer, Abbotsford (AU); Pairatch Paotrakul, Panania (AU)

(73) Assignee: Ainsworth Game Technology Limited, Newington, NSW (AU)

( * ) Notice: Subject to any disclaimer, the term of this patent is extended or adjusted under 35 U.S.C. 154(b) by 184 days.

(21) Appl. No.: 14/822,831

(22) Filed: Aug. 10, 2015

(65) Prior Publication Data

US 2016/0104344 A1 Apr. 14, 2016

(30) Foreign Application Priority Data

Oct. 9, 2014 (AU) ................................ 2014904030

(51) Int. Cl.

| | |
|---|---|
| ***G06F 17/00*** | (2006.01) |
| ***G07F 17/32*** | (2006.01) |
| ***G07F 17/34*** | (2006.01) |

(52) U.S. Cl.

CPC ........ *G07F 17/3258* (2013.01); *G07F 17/326* (2013.01); *G07F 17/3267* (2013.01); *G07F 17/34* (2013.01)

(58) Field of Classification Search

USPC ...................................................... 463/16–25

See application file for complete search history.

(56) References Cited

U.S. PATENT DOCUMENTS

| | | | | |
|---|---|---|---|---|
| 8,500,536 | B2 | 8/2013 | Watkins et al. | |
| 9,600,980 | B2 * | 3/2017 | Clarebrough ........... | G07F 17/34 |
| 2012/0122547 | A1 * | 5/2012 | Aoki ....................... | G07F 17/34 463/20 |
| 2015/0228163 | A1 * | 8/2015 | Clarebrough ....... | G07F 17/3244 463/20 |
| 2015/0287264 | A1 * | 10/2015 | De Viveiros Ortiz .................. | G07F 17/3295 463/25 |

FOREIGN PATENT DOCUMENTS

| | | |
|---|---|---|
| AU | 754689 | 2/1999 |
| AU | 766341 | 1/2002 |
| AU | 2002301056 | 2/2003 |
| AU | 2005202929 | 7/2005 |
| AU | 2007221772 | 4/2008 |
| AU | 2007234470 | 5/2008 |
| AU | 2009202144 | 6/2009 |

(Continued)

*Primary Examiner* — Ronald Laneau

(74) *Attorney, Agent, or Firm* — Cook Alex Ltd.

(57) ABSTRACT

The present invention provides an electronic gaming machine comprising a display for displaying game symbols for playing a game of chance on a plurality of reels. An electronic game controller assigns a number of special symbols to one or more reel strips associated with the reels, the number of special symbols being variable and dependent on a first bet value selected by a player. The appearance of at least two special symbols causes the electronic game controller to activate a bonus game of chance comprising the award of at least one the bonus prize in response to a predetermined outcome of the bonus game of chance. A gaming method is also provided.

23 Claims, 36 Drawing Sheets

(56) References Cited

FOREIGN PATENT DOCUMENTS

| | | |
|---|---|---|
| AU | 2009238326 | 12/2009 |
| AU | 2010200696 | 3/2010 |
| AU | 2011200320 | 2/2011 |
| AU | 2011226970 | 10/2011 |
| AU | 2012201434 | 4/2012 |
| AU | 2012100379 | 5/2012 |
| AU | 2012100430 | 5/2012 |
| AU | 2012100936 | 7/2012 |
| AU | 2012100937 | 7/2012 |
| AU | 2012100938 | 7/2012 |
| AU | 2012100981 | 7/2012 |
| AU | 2012203542 | 7/2012 |

* cited by examiner

ELECTRONIC GAMING MACHINE AND METHOD

BACKGROUND

The present invention relates to an electronic gaming machine and in a particular an electronic gaming machine having a base game and a jackpot-type game. The invention has been developed primarily for use as an electronic gaming machine and will be described hereinafter by reference to this application.

The following discussion of the prior art is intended to present the invention in an appropriate technical context and allow its advantages to be properly appreciated. Unless clearly indicated to the contrary, however, reference to any prior art in this specification should not be construed as an express or implied admission that such art is widely known or forms part of common general knowledge in the field.

Conventional gaming machines typically involve awarding prizes to a player according to predetermined combinations of game symbols that appear on an array of game squares displayed on a screen, typically organised into three rows and five columns (a 5×3 array). Other arrays, such as a 3×3 or 4×3, may be used. Each gaming machine randomly selects the game symbols that appear on the array, each column of the array being a "reel".

In an electronic gaming machine, the mechanical reels are replaced with video images of the reels, which are displayed on a video display screen. The electronic gaming machine has an internal electronic game controller, typically a computer, computational processor or other central processing unit, that controls the display of images on the video display screen so that the reels are visibly spun on the screen to simulate a physical reel of a traditional gaming machine. Electronic gaming machines are also more versatile in presenting game information, varying the probabilities for a player to win a prize and varying the type of game that is played.

Bonus or "feature" games may also be provided by an electronic gaming machine in addition to a base or main game. Typically feature games use the same set of reels as the main game and are limited to a set of free games operated under a single set of rules. This means that the feature game is restricted by the same set of rules, and so there is no variation in the play of the feature game.

Also, electronic gaming machines can offer one or more bonus prizes to the player during play of the game. The most common type of bonus prize that is awarded by the electronic gaming machine is a jackpot prize, the main example of which is a progressive jackpot prize.

This standard structure to game play and bonus prizes limits the variation in the play of the electronic gaming machine. Consequently, it is difficult to retain player interest because there is no apparent incentive for the player to continue playing the same electronic gaming machine once the player becomes familiar with the feature game, the main game and any bonus prizes. Also, it is difficult to retain player interest since there is little differentiation between gaming machines in terms of the main and feature games that are played.

It is an object of the present invention to overcome or substantially ameliorate one or more of the disadvantages of prior art, or at least to provide a useful alternative. It is an object of the invention in at least one preferred embodiment to provide an electronic gaming machine and a gaming method for an electronic gaming machine that encourages player interest.

SUMMARY

According to a first aspect of the present invention, there is provided an electronic gaming machine comprising:

a display for displaying game symbols for playing a game of chance, wherein said game of chance comprises randomly displaying said game symbols in a plurality of reels and awarding prizes to a player for predetermined winning combinations of game symbols appearing on said reels; and an electronic game controller in electronic communication with said display for controlling the appearance of said game symbols in said game of chance on the display;

wherein said electronic game controller assigns a number of special symbols to one or more reel strips associated with said reels, said number of special symbols being variable and dependent on a first bet value selected by said player; and wherein the appearance of at least two special symbols in said game of chance causes said electronic game controller to activate a bonus game of chance comprising the award of at least one said bonus prize by said electronic game controller in response to a predetermined outcome of said bonus game.

Preferably, there is a plurality of selectable bet options selectable by said player, said selectable bet options corresponding to different first bet values, and the probability of activating said bonus game of chance increases proportionally between two of said selectable bet options.

Preferably, each said selectable bet option is associated with a pay table for determining the values of prizes awarded in response to said predetermined winning combinations of game symbols, a value for at least one prize in the pay table of one selectable bet option being greater than the value for said at least one prize in the pay table of another selectable bet option. In one embodiment, a value for at least one prize in the pay table of one said selectable bet option is a linear increase of the value for said at least one prize in the pay table of said another selectable bet option. In another embodiment, a value for at least one prize in the pay table of one said selectable bet option is a non-linear increase of the value for said at least one prize in the pay table of said another selectable bet option.

Preferably, said at least one prize comprises each of the prizes in the pay tables of one said selectable bet option and said another selectable bet option. That is, the value for each prize in the pay table of said one selectable bet option is greater than the value for the same prize in the pay table of said another selectable bet option. In one embodiment, the value for each prize in the pay table of said one selectable bet option is a linear increase of the value for the same prize in the pay table of said another selectable bet option. In a further embodiment, the value for each prize in the pay table of said one selectable bet option is a non-linear increase of the value for the same prize in the pay table of said another selectable bet option.

Preferably, said electronic game controller causes a meter to be shown on said display, said meter indicating a number associated with a total number of said special symbols currently assigned to said reel strips.

Preferably, said electronic game controller causes a dynamic graphical image to be shown on said display, said dynamic graphical image indicating the probability of activating said bonus game of chance.

Preferably, said electronic game controller awards a multiplier that increases the value of said prizes in response to the appearance of a multiplier symbol, said multiplier symbol being randomly selected from a range of multiplier symbols having different multiplier values, and said range of multiplier symbols being dependent on a second bet value selected by said player. More preferably, said second bet value is different to said first bet value. In one embodiment, said first bet value and said second bet value are combined to represent the total bet made by said player. In another embodiment, said multiplier values of said multiplier symbols in said range increase as the selected second bet value increases.

Preferably, said special symbols comprise trigger symbols for triggering a feature game of chance. More preferably, said special symbols comprise scatter symbols.

Preferably, one or more jackpot meters are shown on said display, said one or more jackpot meters being associated with the award of one or more jackpots. More preferably, at least one jackpot meter displays designated game symbols as they appear in said game of chance. In one embodiment, said at least one jackpot meter comprises an jackpot meter array of symbol positions, wherein said designated game symbols are displayed in the symbol positions of said jackpot meter array.

Preferably, said bonus game of chance is associated with said one or more jackpot meters, said bonus game of chance comprises a bonus array of selectable symbol positions, wherein selection of a symbol position by said player reveals a game symbol or said designated game symbol and said at least one jackpot meter increases for each revealed designated game symbol. More preferably, said at least one jackpot meter increases by displaying said revealed designated game symbol in a symbol position of said jackpot meter array. In one embodiment, the jackpot associated with said at least one jackpot meter is awarded when said at least one jackpot meter displays said designated game symbol in each symbol position of said jackpot meter array.

Preferably, at least two of said jackpot meters have different bonus prizes. In one embodiment, said different bonus prizes award monetary prizes of different values.

Preferably, there is also a feature game of chance that is activated by a trigger event in said game of chance. More preferably, said feature game of chance is played prior to playing the bonus game of chance. In one embodiment, said electronic game controller causes the display of a graphical image or message advising that said bonus game of chance would be played after completion of said feature game of chance.

In one embodiment, said feature game of chance is activated by the appearance of said at least two special symbols in said game of chance. In another embodiment, said trigger event comprises a random event determined by said electronic game controller at the start of play of said game of chance. In a further embodiment, the trigger event comprises the appearance of at least one trigger symbol in said game of chance. In another alternative, the trigger event comprises an in-game event during play of the said game of chance.

Preferably, said feature game of chance comprises displaying randomly selected game symbols in an array of symbol positions and where prizes are awarded to a player for predetermined winning combinations of game symbols appearing on said array, wherein said prizes are of increased value compared to said prizes awarded in said game of chance. More preferably, said feature game of chance comprises one or more additional game symbols exclusive to said feature game of chance, one of said exclusive game symbols conferring a game enhancing element upon said player.

Preferably, said game enhancing element modifies the result of a play of said game. In some embodiments, said game enhancing element comprises at least one or more of a predetermined number of free games, bonus prizes, collector symbols, a win multiplier, wild multipliers, bonus wilds, symbols that cause the award of additional free games, trigger symbols to retrigger the selected wheel or enhanced wheel, directly retriggering the selected wheel or enhanced wheel, held columns, random wild symbols, progressives, bonus credits, jackpot symbols, and one or more symbol replacements.

Preferably, said reels are organised into an array having a polygonal shape. For example, said array can take any one of a rectangular, square, triangular, pentagonal, octagonal or non-rectangular polygonal shape. In one embodiment, said array is the industry standard 5×3 array of rows and columns. In another embodiment, said array can be irregular in shape, such as for example having an unequal number of rows or columns.

Preferably, the player selectively starts and/or stops play of said reels in said game of chance array and/or said reels in said feature game of chance.

Preferably, said electronic gaming machine comprises a housing having said display and containing said electronic game controller.

Preferably, said electronic gaming machine comprises an input device. It is also preferred that said input device comprises one or more buttons on said housing, said buttons being in electronic communication with said electronic game controller to transmit player commands to said electronic game controller. More preferably, said buttons are arranged on a console of said housing. Alternatively or additionally, said input device comprises a touch sensitive surface on said display for receiving player commands, said touch sensitive surface being in electronic communication with said electronic game controller to transmit player commands to said electronic game controller.

Preferably, said electronic gaming machine comprises a value transfer mechanism for paying said prizes to said player using value in an amount equal to an awarded prize. Alternatively or additionally, said value transfer mechanism also receives value from said player to initiate said bet. More preferably, said value transfer mechanism is in electronic communication with said electronic game controller. It is also preferred that said value transfer mechanism is provided on said housing. In one embodiment, said value transfer mechanism comprises one or more vending slots for paying and/or receiving value. In other embodiments, said value transfer mechanism comprises a value input/value output device. In further embodiments, said value transfer mechanism comprises a coin slot or acceptor, a paper currency acceptor, a ticket reader and/or printer or a card reader and/or writer.

Throughout the specification and unless explicitly stated otherwise, the term "value" means credits, gaming tokens, coins, paper, currency, tickets, vouchers, credit cards, debit cards, smart cards, memory devices capable of storing value and any other object representative of value.

Preferably, the electronic gaming machine comprises a mobile electronic gaming device. More preferably, said mobile electronic gaming device comprises a handheld electronic device. In one embodiment, said handheld electronic device comprises a handheld electronic gaming device or a smart phone. Alternatively, said electronic gaming machine comprises a computer. More preferably, said computer is connected to a communication network.

A second aspect of the present invention provides an electronic gaming machine comprising:

a display for displaying game symbols for playing a game of chance, said game of chance comprising randomly displaying said game symbols in a plurality of reels and awarding prizes to a player for predetermined winning combinations of game symbols appearing on said reels;

an electronic game controller in electronic communication with said display for controlling the appearance of game symbols in said game of chance on the display; and a value transfer mechanism for receiving value from a player to make a bet and initiate play of said game of chance on said display;

wherein said electronic game controller in response to said player making said bet via said value transfer mechanism commences play of said game of chance;

wherein said electronic game controller assigns a number of special symbols to one or more reel strips associated with said reels, said number of special symbols being variable and depending on a first bet value selected by said player; and wherein the appearance of at least two special symbols in said game of chance causes said electronic game controller to activate a bonus game of chance comprising the award of at least one said bonus prize by said electronic game controller in response to a predetermined outcome of said bonus game.

This aspect of the invention preferably has the preferred features of the first aspect of the invention stated above, where applicable.

According to a third aspect of the invention, there is provided a gaming method for an electronic gaming machine comprising a display and an electronic game controller, comprising:

controllably displaying game symbols on said display to play a game of chance, wherein said game of chance comprises randomly displaying said game symbols in a plurality of reels and awarding prizes to a player for predetermined winning combinations of game symbols appearing on said reels;

assigning a number of special symbols to one or more reel strips associated with said reels, said number of special symbols being variable and dependent on a first bet value selected by said player; and in response to the appearance of at least two special symbols in said game of chance, activating a bonus game of chance comprising the award of at least one said bonus prize in response to a predetermined outcome of said bonus game.

Preferably, said method comprises associating each said selectable bet option with a pay table for determining the values of prizes awarded in response to said predetermined winning combinations of game symbols and configuring said pay tables so that a value for at least one prize in the pay table of one selectable bet option is greater than the value for said at least one prize in the pay table of another selectable bet option. In one embodiment, said configuring step comprises making a value for at least one prize in the pay table of one said selectable bet option a linear increase of the value for said at least one prize in the pay table of said another selectable bet option. In another embodiment, said configuring step comprises making a value for at least one prize in the pay table of one said selectable bet option a non-linear increase of the value for said at least one prize in the pay table of said another selectable bet option.

Preferably, said configuring step comprises configuring said pay tables so that the value for each prize in the pay table of said one selectable bet option is greater than the value for the same prize in the pay table of said another selectable bet option. In one embodiment, said configuring step comprises making the value for each prize in the pay table of said one selectable bet option a linear increase of the value for the same prize in the pay table of said another selectable bet option. In a further embodiment, said configuring step comprises making the value for each prize in the pay table of said one selectable bet option a non-linear increase of the value for the same prize in the pay table of said another selectable bet option.

Preferably, said method further comprises said electronic game controller causing a meter to be shown on said display, said meter indicating a number associated with a total number of said special symbols currently assigned to said reel strips.

Preferably, said method further comprises said electronic game controller causing a dynamic graphical image to be shown on said display, said dynamic graphical image indicating the probability of activating said bonus game of chance.

Preferably, said method further comprises said electronic game controller awarding a multiplier that increases the value of said prizes in response to the appearance of a multiplier symbol, said multiplier symbol being randomly selected from a range of multiplier symbols having different multiplier values, said range of multiplier symbols being dependent on a second bet value selected by said player. More preferably, said second bet value is different to said first bet value. In one embodiment, said first bet value and said second bet value are combined to represent the total bet made by said player. In another embodiment, said multiplier values of said multiplier symbols in said range increase as the selected second bet value increases.

Preferably, said method further comprises showing one or more jackpot meters on said display, said one or more jackpot meters being associated with the award of one or more jackpots of one or more jackpot meters associated with the award of one or more jackpots. More preferably, said method further comprises displaying designated game symbols as they appear in said game of chance in said at least one jackpot meter. In one embodiment, said at least one jackpot meter comprises a jackpot meter array of symbol positions, and said method comprises displaying said designated game symbols in the symbol positions of said jackpot meter array.

Preferably, said method comprises associating said bonus game of chance with said one or more jackpot meters, said bonus game of chance comprises a bonus array of selectable symbol positions; selecting a symbol position to reveal a game symbol or said designated game symbol; and increasing said at least one jackpot meter for each revealed designated game symbol. More preferably, said increasing step comprises displaying said revealed designated game symbol in a symbol position of said jackpot meter array. In one embodiment, the method comprises awarding the jackpot associated with said at least one jackpot meter when said at least one jackpot meter displays said designated game symbol in each symbol position of said jackpot meter array.

Preferably, said method comprises providing at least two of said jackpot meters with different bonus prizes. In one embodiment, said different bonus prizes award monetary prizes of different values.

Preferably, said method comprises activating a feature game of chance in response to a trigger event in said game of chance. More preferably, said method comprises playing said feature game of chance prior to playing the bonus game of chance. In one embodiment, said electronic game controller causes the display of a graphical image or message advising that said bonus game of chance would be played after completion of said feature game of chance.

The method of the third aspect of the invention preferably has the preferred features of the first aspect of the invention stated above, where applicable.

A fourth aspect of the present invention provides a gaming method for an electronic gaming machine comprising display for displaying a game of chance, wherein said game of chance comprises game symbols arranged into a plurality of reels and where predetermined winning combinations of randomly selected game symbols in said game award prizes to a player; an electronic game controller for controlling the display of game symbols on said display; and a value transfer mechanism for receiving value from a player to make a bet and initiate play of said game of chance, the method comprising:

said value transfer mechanism receiving value from a player to make said bet and initiate play of said game on said display;

said electronic game controller assigning a number of special symbols to one or more reel strips associated with said reels, said number of special symbols being variable and depending on a first bet value selected by said player; and in response to the appearance of at least two special symbols in said game of chance, activating a bonus game of chance comprising the award of at least one said bonus prize in response to a predetermined outcome of said bonus game.

The method of the fourth aspect of the invention preferably has the preferred features of the third aspect of the invention stated above, where applicable.

According to a fifth aspect of the invention, there is provided a computer system comprising a central processing unit configured for communication with an electronic gaming machine, wherein said computer system is configured to perform the method of the third or fourth aspects of the invention.

According to a sixth aspect of the invention, there is provided a computer programme configured to perform the method of the third or fourth aspects of the invention.

According to a seventh aspect of the invention, there is provided a non-transitory carrier medium carrying computer executable code that, when executed on a central processing unit configured for communication with an electronic gaming machine, causes the central processing unit to perform the method of the third or fourth aspects of the invention.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Furthermore, as used herein and unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

BRIEF DESCRIPTION OF THE DRAWINGS

A preferred embodiment of the invention will now be described, by way of example only, with reference to the accompanying drawings in which.

DETAILED DESCRIPTION OF VARIOUS EMBODIMENTS

Figure 1:
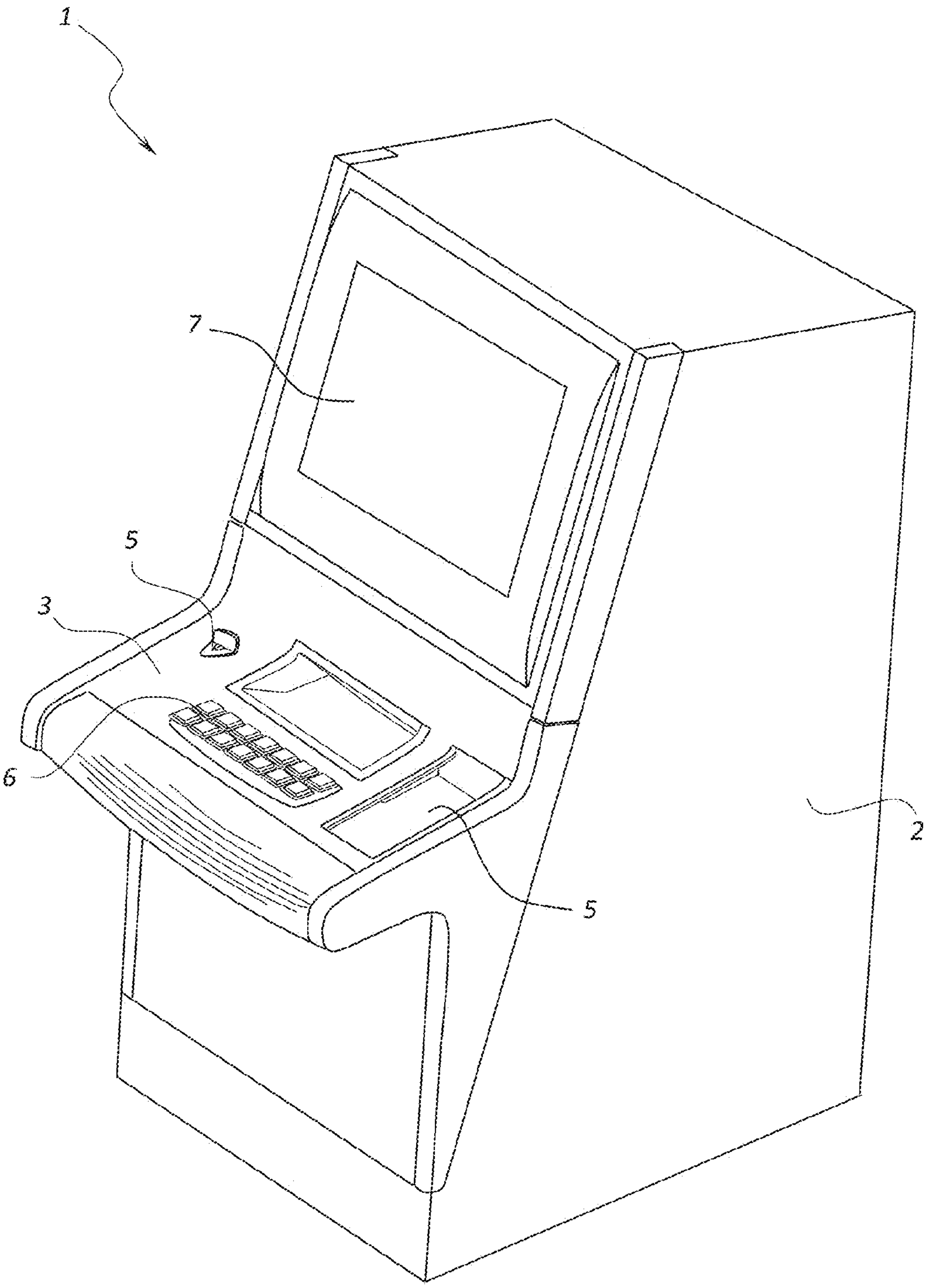
FIG. 1 is a perspective view of an electronic gaming machine according to a first embodiment of the invention.

The present invention will now be described with reference to the following examples which should be considered in all respects as illustrative and non-restrictive. In the Figures, corresponding features within the same embodiment or common to different embodiments have been given the same reference numerals.

Referring to FIG. 1, an electronic gaming machine 1 according to a first embodiment of the invention includes a cabinet 2, a console 3 and an internal electronic game controller 4. The console 3 has various input devices including vending slots 5 for receiving monetary bets and a plurality of buttons 6 for actuation by a player. It will be appreciated that in other embodiments the vending slots 5 may be replaced with other types of value input/value output devices, such as a coin acceptor, a paper currency acceptor, a ticket reader and/or printer or a card reader and/or writer.

The vending slots 5 can be configured to receive value, such as cash in the form of banknotes and coins, or credits representing a monetary amount from a memory device, such as but not limited to a memory card, smart card, a radio frequency identification (RFID) device, USB key, magnetic card or other electronic storage device. Typically, the memory device is a credit card, debit card or other card that enables the transfer of monetary credit to the electronic gaming machine 1. Other forms of value include gaming tokens, paper, tickets, vouchers, and any other object representative of value.

Figure 2:
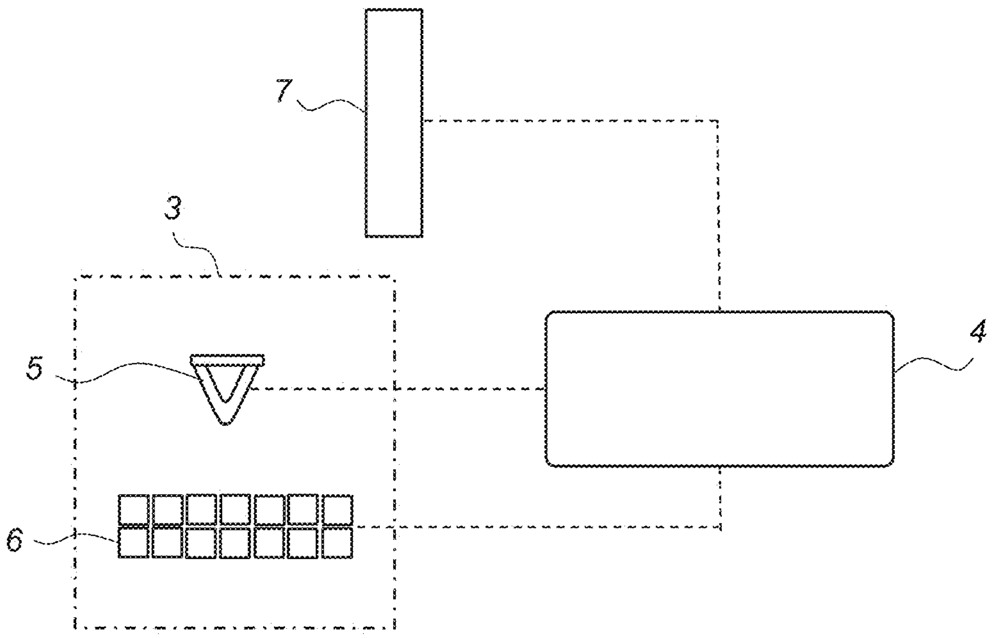
FIG. 2 is a schematic drawing of an electronic game controller for the electronic gaming machine of FIG. 1.

The electronic game controller 4 is generally in the form of a central processing unit, such as a computer, and is in electronic communication with a display in the form of a video display screen 7, as well as various input devices on the console 3, as best shown in FIG. 2. Typically, the electronic game controller 4 also comprises a random access memory (RAM) associated with the central processing unit, the RAM being used to store programme instructions and transient data related to the operation of the electronic game controller and hence the electronic gaming machine 1. The RAM contains a body of program instructions for implementing a game on the electronic gaming machine 1, as discussed in more detail below. The central processing unit or processor may also be operatively associated with a further storage device, such as a hard disk drive, which is used for long-term storage of program components and data relating to the electronic game controller 4 and/or the electronic gaming machine 1, including a database for game performance data, as well as information gathered from users. It is also appreciated that a person skilled in the art would readily understand the location and use of the electronic game controller 4 in the electronic gaming machine 1.

The electronic game controller 4 will transmit and receive signals to and from each of the input devices and the display 7, usually via wired connections but can include wireless modes of electronic communication, such as WLAN. In the case of the vending slots 5 (or with any other type of value transfer mechanism), there may be an intermediate credit verification device that examines and verifies the cash or credits received by the vending slots. Once the value (such as cash or credits) have been verified by the credit verification device, a signal is sent to the electronic game controller 4, which then determines whether the minimum bet level has been reached. If so, the electronic game controller 4 will permits play of the game on the electronic gaming machine 1. If not, the electronic game controller 4 will send a signal to the display 7 to show a message requesting further value to be added to the electronic gaming machine 1.

Figure 11A:
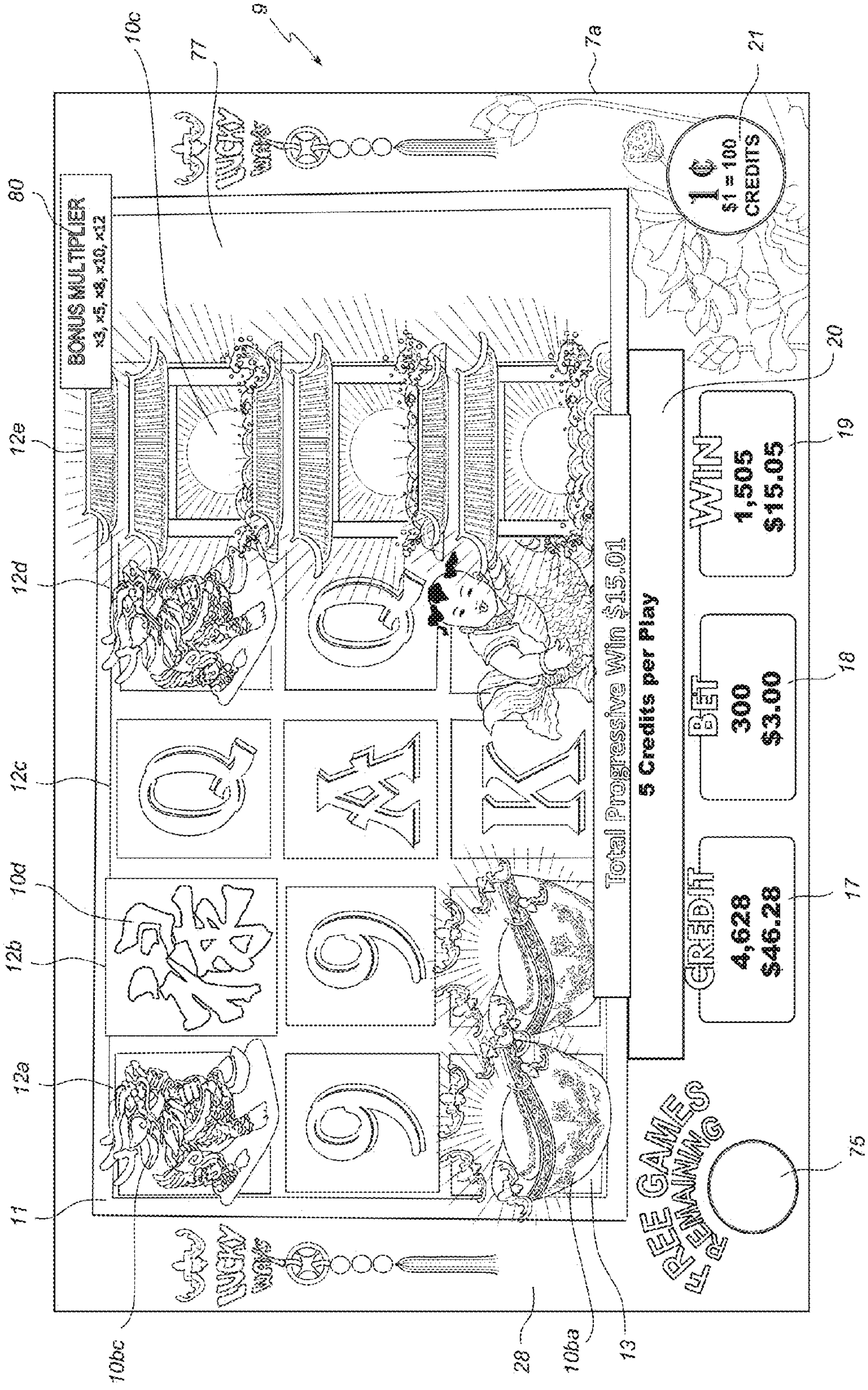
FIGS. 11A and 11B are simulated screen shots of the lower part of the display of the electronic gaming machine of FIG. 1 illustrating a feature game.
Figure 11B:
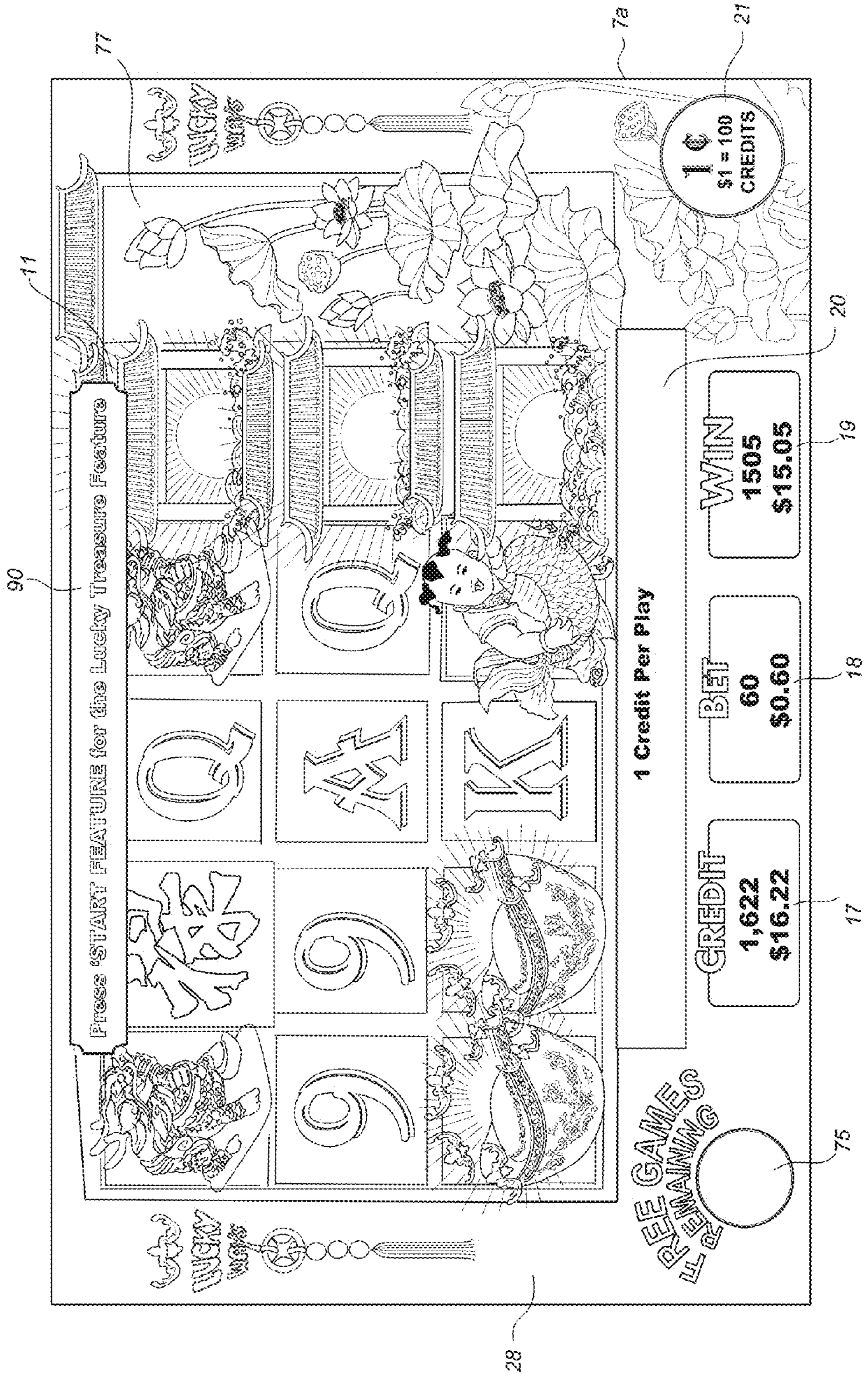

The electronic game controller 4 is programmed to provide a game in the form of a base game 8 (as best shown in FIGS. 3A, 4A, 5A, 6A and 7A) and a feature game 9 (as best shown in FIGS. 11A and 11B) on a lower playing area 7*a* of the display 7 of the electronic gaming machine 1 for play by a player. The base game 8 has game symbols 10 arranged into an array 11 in the form of five columns or "reels" 12, as best shown in FIGS. 3A, 4A, 5A, 6A and 7A. The reels 12 give the visual appearance of rotating, typically by having the game symbols 10 move in a downward linear path along the length of each reel 12. While the array 11 is arranged with five reels 12 and three rows as per the industry standard, it will be appreciated by one skilled in the art that other types of arrays could be used, such as 3×3, 4×3, 5×5, 4×4, etc, including arrays having an irregular number of rows and/or columns. For example, the array 11 can have an unequal number of rows and/or columns, where some columns have less or more rows than other columns or where some rows have less or more columns than other rows. A more specific example would be an array having three columns with only two rows and two columns with three rows. The electronic game controller 4 will transmit signals to the display screen 7 to cause the base game 8 and feature game 9 to be played on the lower playing area 7*a*, including showing the game symbols 10, array 11 and other visible elements of the games.

The array 11 of the base game 8 defines predetermined symbol positions 13, in which the game symbols 10 appear. The symbol positions 13 are not visually marked by boundary lines and simply provide an area for the game symbols 10 to appear. However, it will be appreciated that in other embodiments, the symbol positions 13 are defined by visible boundary lines (to define "squares" or "cells") or other markings to define each respective area of the symbol positions or game positions.

The array 11 is arranged so that a player can select one or more predetermined "pay lines" 14 defined around the array, which correspond to combinations of the symbol or game positions 13. The pay lines 14 correspond to the lines selected by the player and generally comprise at least one game position or symbol position 13 from each reel 12. The number of pay lines 14 that can be selected by the player depends on the amount of the monetary bet for playing a game on the array 11. In the base game 8, predetermined winning combinations of randomly selected game symbols 10 result in the award of prizes to the player.

The game symbols 10 can include a mixture of picture symbols (such as animal symbols or playing card symbols), word symbols, scatter symbols, substitute or wild card symbols and trigger symbols. Those skilled in the art will readily understand that a substitute symbol is able to act as any other game symbol, and hence is also known as a "wild card" symbol. Likewise, those skilled in the art will readily understand that a scatter symbol is a symbol that triggers a game event or confers an award without having to appear on a player-selected pay line 14. Similarly, a trigger symbol is a symbol that triggers a game event (like activating a feature game) or confers an award, where the trigger symbol may or may not have to appear in combination and may or may not have to appear on the same player-selected pay line 14. In this embodiment, the game symbols 10 include playing card symbols 10*a*, item-themed symbols 10*b* (including gold tael symbol 10*ba*, shield symbol 10*bb* and lion symbol 10*bc*), substitute or wild card symbols in the form of temple symbol 10*c* and prosperity symbol 10*d*, and a scatter symbol in the form of a "Lucky Boy" symbol 10*e*. The electronic game controller 4 randomly determines the appearance of the game symbols 10 on the array 11.

The lower playing area 7*a* of the video screen 7 also displays other standard game information including the amount of player credits 17, the amount of the current bet wagered by the player 18, the amount of wins by the player 19, a message area 20, a current denomination button 21 indicating the currently selected base bet denomination, the name 24 of the game "Lucky Treasure" being played and its overarching theme or brand 25 "Lucky Ways". Other standard information may also include the number of pay lines available, the number of player-selected pay lines, a message area or strip associated with the denomination button 21, a menu button for bringing up a menu screen (typically explaining the game rules and showing the available pay lines 14).

In the base game 8, the player initially makes a bet using vending slots 5 to initiate play of the electronic gaming machine 1 by building up credit to play the base game 8 on the electronic gaming machine. For example, the player can bet or wager monetary amounts equivalent to a particular amount of credits, depending on the bet denomination selected for the base game. Also, the player can make any additional side bets or ante-bets during play of the base game once the game has commenced to access additional features in the game, such as increasing the number of winning combinations in the game.

Typically, electronic gaming machines offer a number of preset bet options that the player can make, and these bet options can vary depending on the game or games offered on the electronic gaming machine. For example, a game on an electronic gaming machine may provide bet options of 1 credit, 2 credits, 5 credits and 10 credits per player-selected pay line 14. In another example, the player may bet 1 credit, 2 credits, 5 credits and 10 credits for a preset group or combination of pay lines 14, such as a group of 5 pay lines, 10 pay lines, 20 pay lines, etc. Usually, the bet option selected determines the number of pay lines 14 that become payable in the base game 8 and/or feature game 9.

The electronic gaming machine 1 also has a default bet denomination, which is usually the bet denomination that was previously used in the preceding play of the base game 8. For example, if a person had played the base game 8 with a bet denomination of 5¢, then this would be the default bet denomination for the player when he or she commences play of the game. Where the electronic gaming machine has not yet been played or has been started up, the default bet denomination is initially selected by the electronic game controller 4. The default bet denomination can be randomly selected or chosen according to a predetermined order. Usually, the electronic game controller 4 will select the bet denomination with the lowest value that is available for the base game 8, which would be the 1¢ bet denomination for this embodiment. The player may change the bet denomination at any time in the base game 8 by touching the denomination button 21 before or after the reels 12 have spun.

In this embodiment, there are five selectable bet options, named "Play 1", "Play 2", "Play 3", "Play 4" and "Play 5". Each of the selectable bet options are associated with different pay tables that are distinguished visually according to their colour. For example, Play 1 is associated with a green coloured pay table, Play 2 is associated with a blue coloured pay table, Play 3 is associated with a purple coloured pay table, Play 4 is associated with a yellow coloured pay table, and Play 5 is associated with a red coloured pay table. The Play 1 selectable bet option comprises a bet of 5 credits, the Play 2 selectable bet option comprises a bet of 10 credits, the Play 3 selectable bet option comprises a bet of 15 credits, the Play 4 selectable bet option comprises a bet of 30 credits, and the Play 5 selectable bet option comprises a bet of 60 credits in which a player may make two play the base game 8. The Play 5 selectable option represents a maximum bet option corresponding to the maximum bet on each line for the maximum amount of credit.

In addition, the player also selects a Credits bet per Play option from one of 1 credit bet per Play, 2 credits bet per Play, 3 credits bet per Play, 4 credits bet per Play and 5 credits bet per Play. The selected Credits bet per Play option multiplies the selected bet option from the selectable Play 1, Play 2, Play 3, Play 4 or Play 5 bet options to make up the total or final bet made to play the base game 8. For example, a player may select the combination of the Play 2 bet option and the 5 credits bet per Play option, which results in a total bet of 50 credits (the Play 2 bet option being 10 credits, which is multiplied by the 5 credits bet per Play value).

It will be appreciated that any combination of Credits bet per play and the Play 1 to Play 5 bet options is available to the player. That is, for each Play 1 to Play 5 bet option, the player can choose to bet from 1 credit bet per Play to 5 credits bet per Play. In this embodiment, the player initially chooses or selects one of the Play 1 to Play 5 bet options and then the Credits bet per Play option. However, in some embodiments, the order of selection is reversed or preset combinations of are displayed on the video screen 7 for selection by the player. In other embodiments, there is no Credit bet per Play option and instead the values for the selectable bet options are equivalent to the total bet or are increased to correspond to the total bet.

Figure 3A:
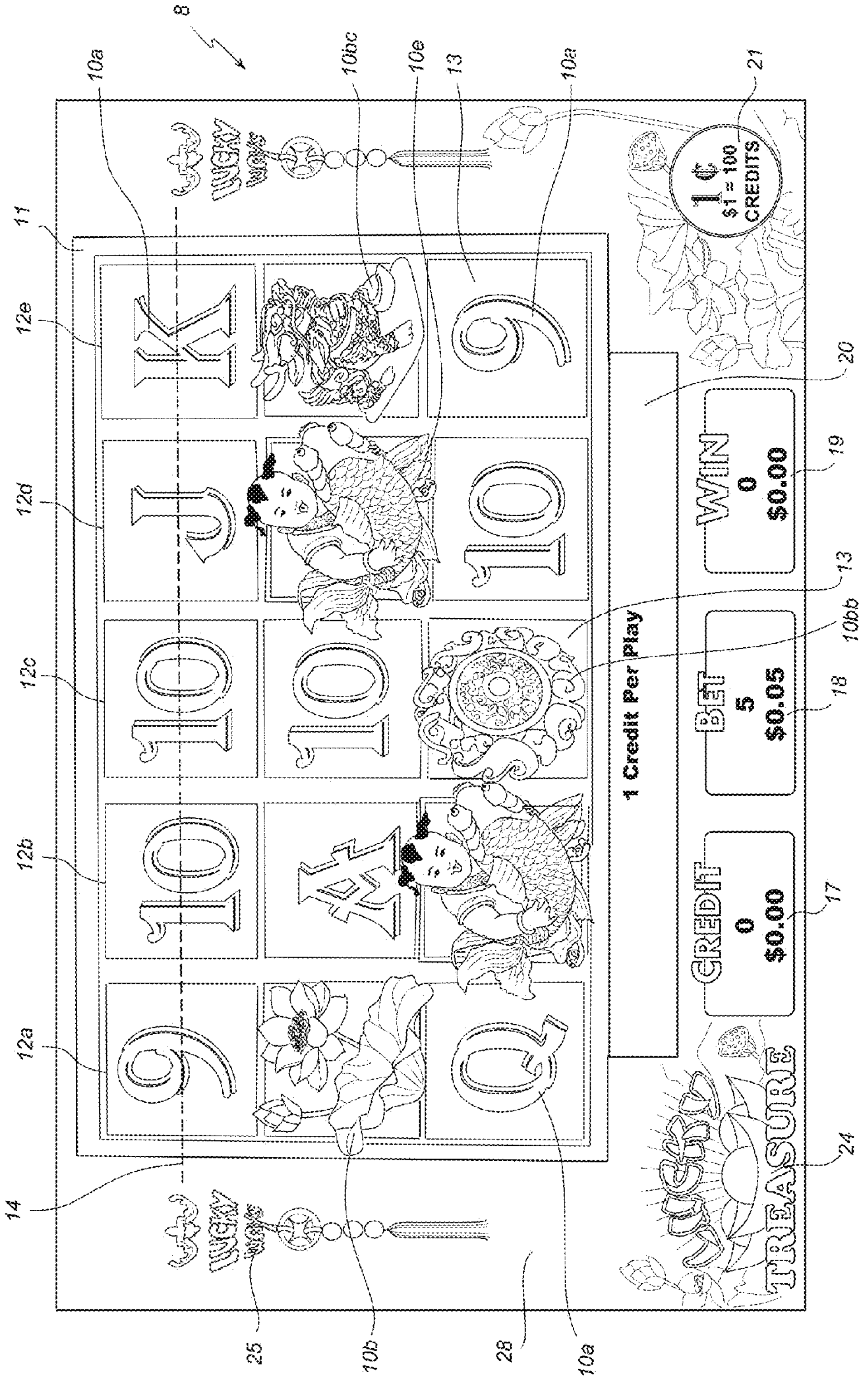
FIGS. 3A and 3B are simulated screen shots of the lower and upper parts, respectively, of the display of the electronic gaming machine of FIG. 1 illustrating a base game.
Figure 3B:
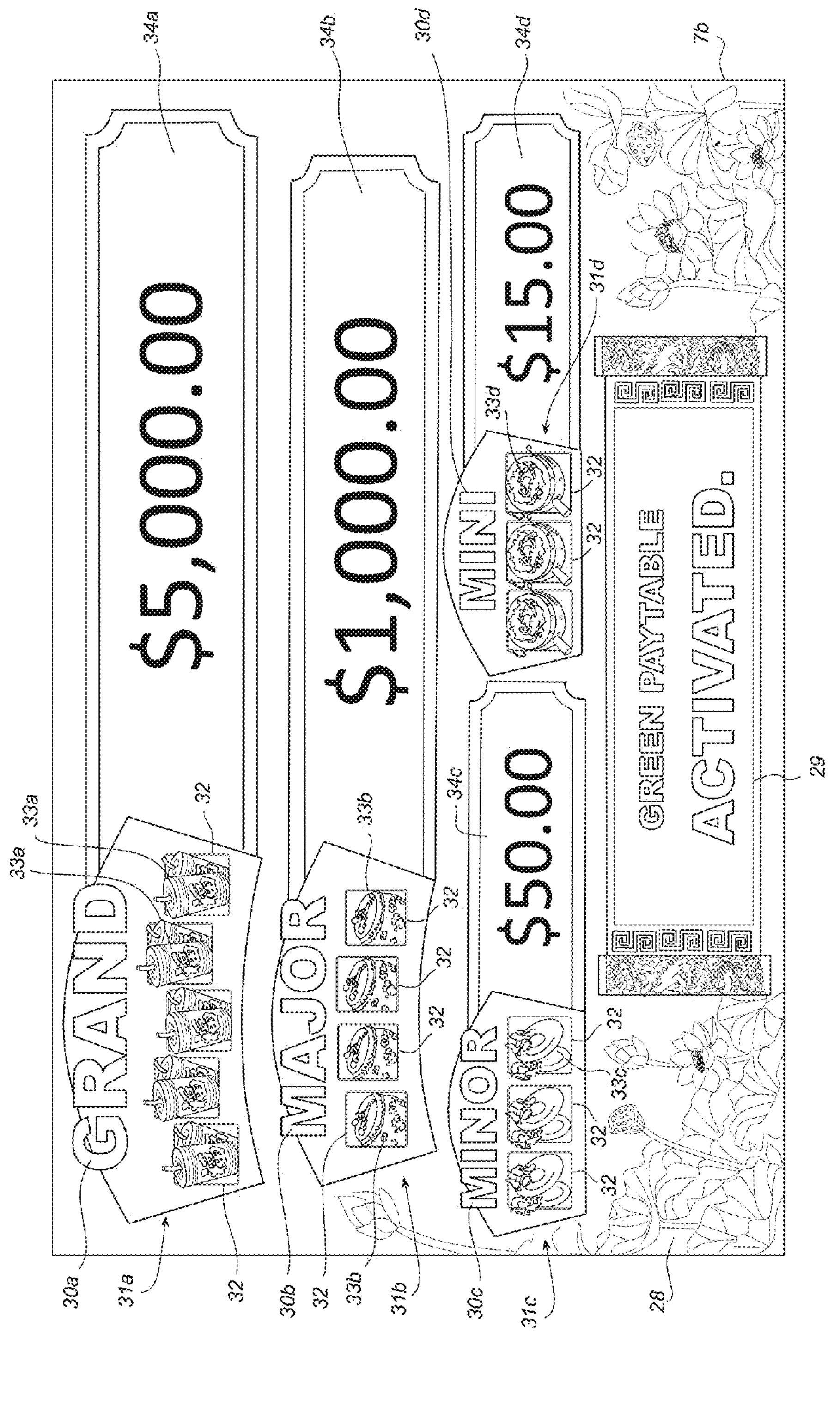
Figure 4A:
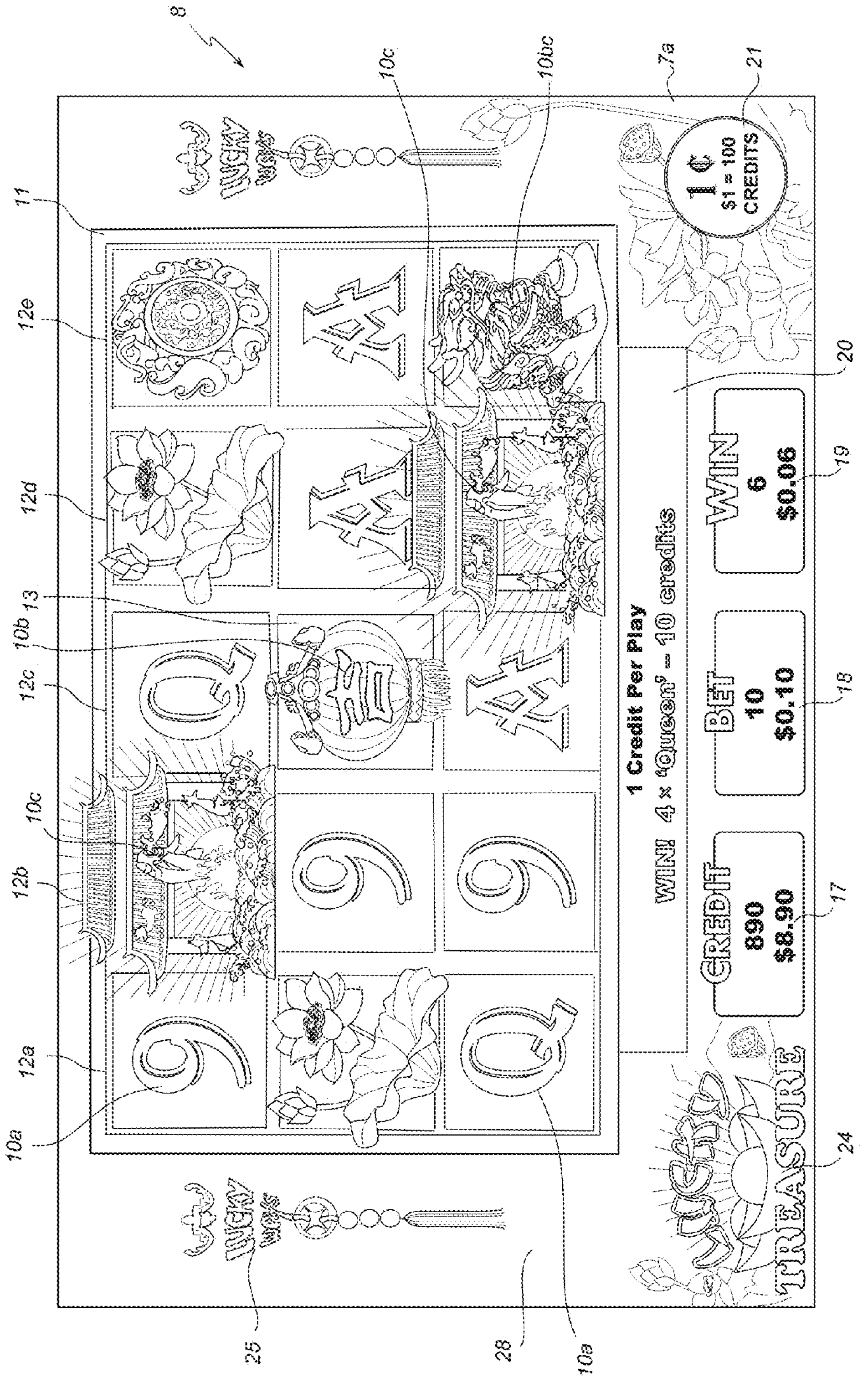
FIGS. 4A and 4B are simulated screen shots of the lower and upper parts, respectively, of the display of the electronic gaming machine of FIG. 1 illustrating the base game.
Figure 4B:
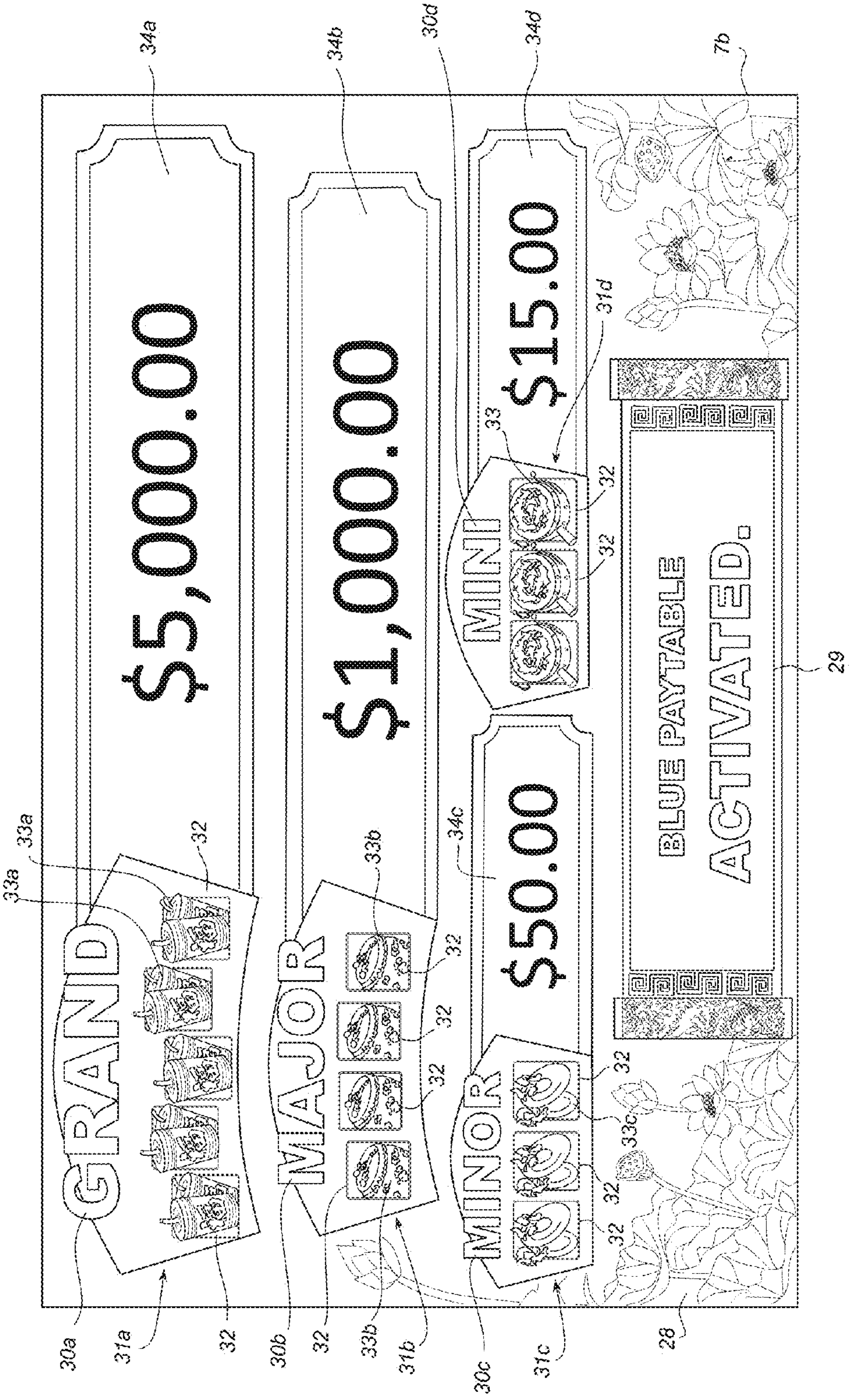
Figure 5A:
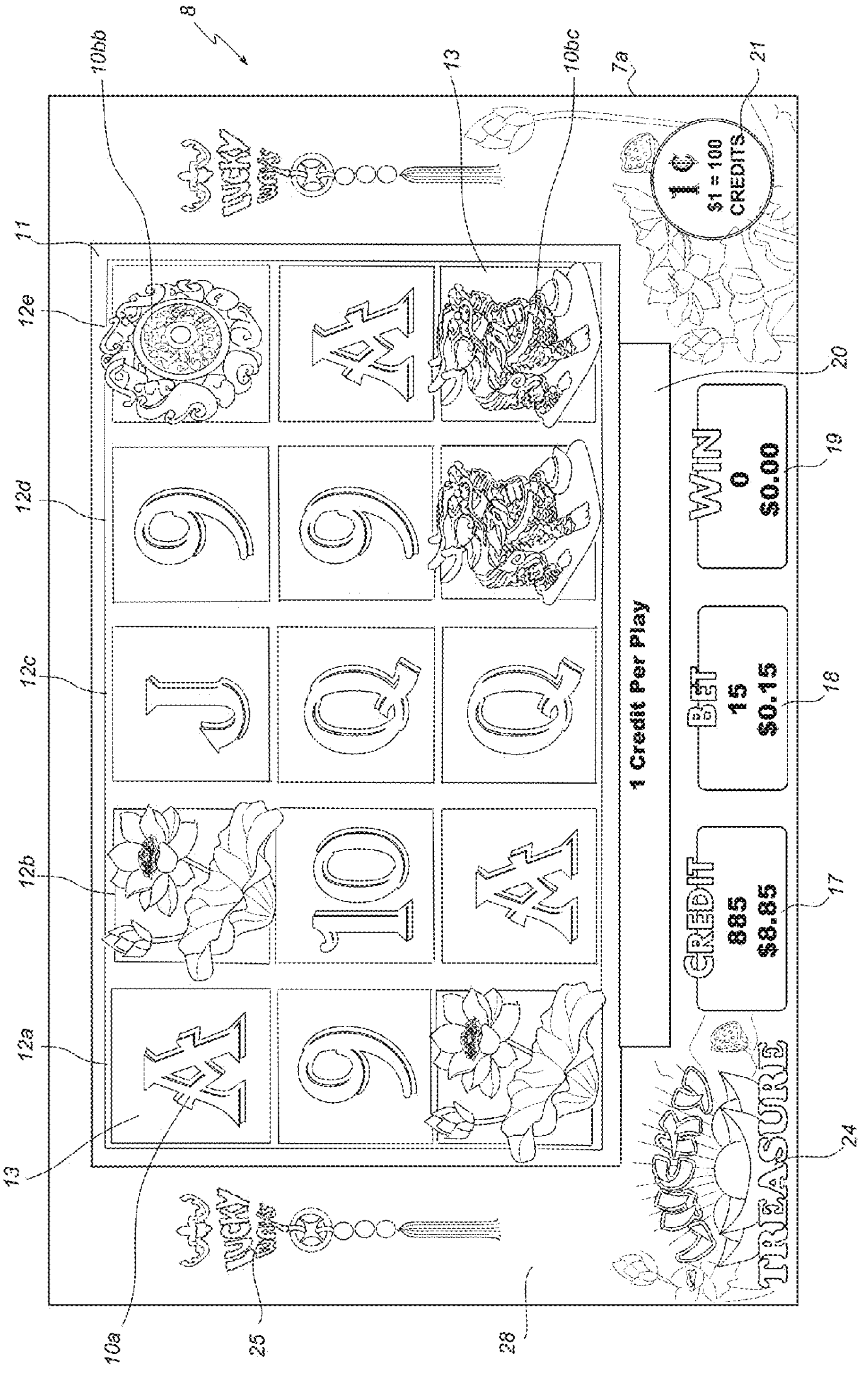
FIGS. 5A and 5B are simulated screen shots of the lower and upper parts, respectively, of the display of the electronic gaming machine of FIG. 1 illustrating the base game.
Figure 5B:
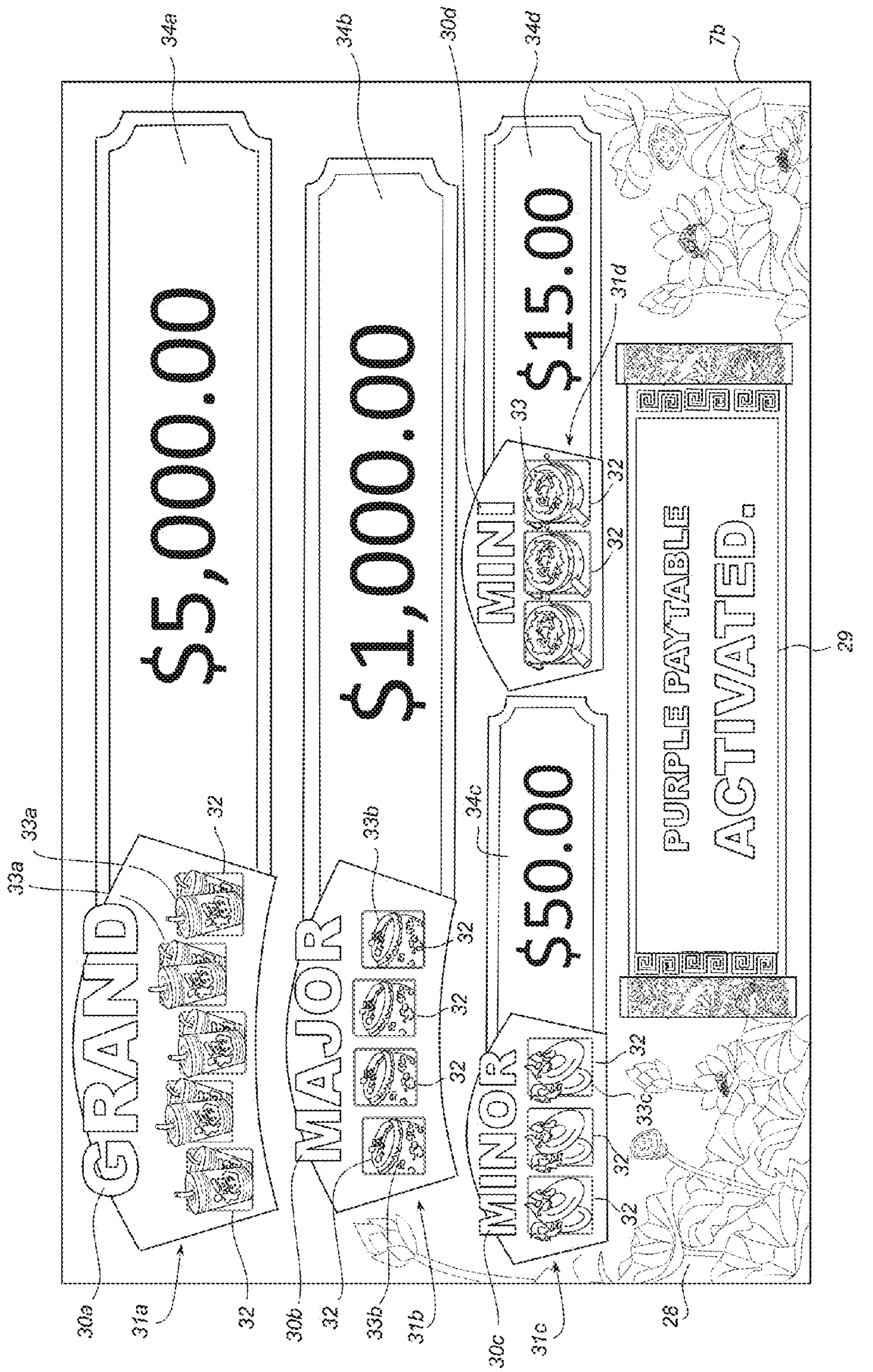
Figure 6A:
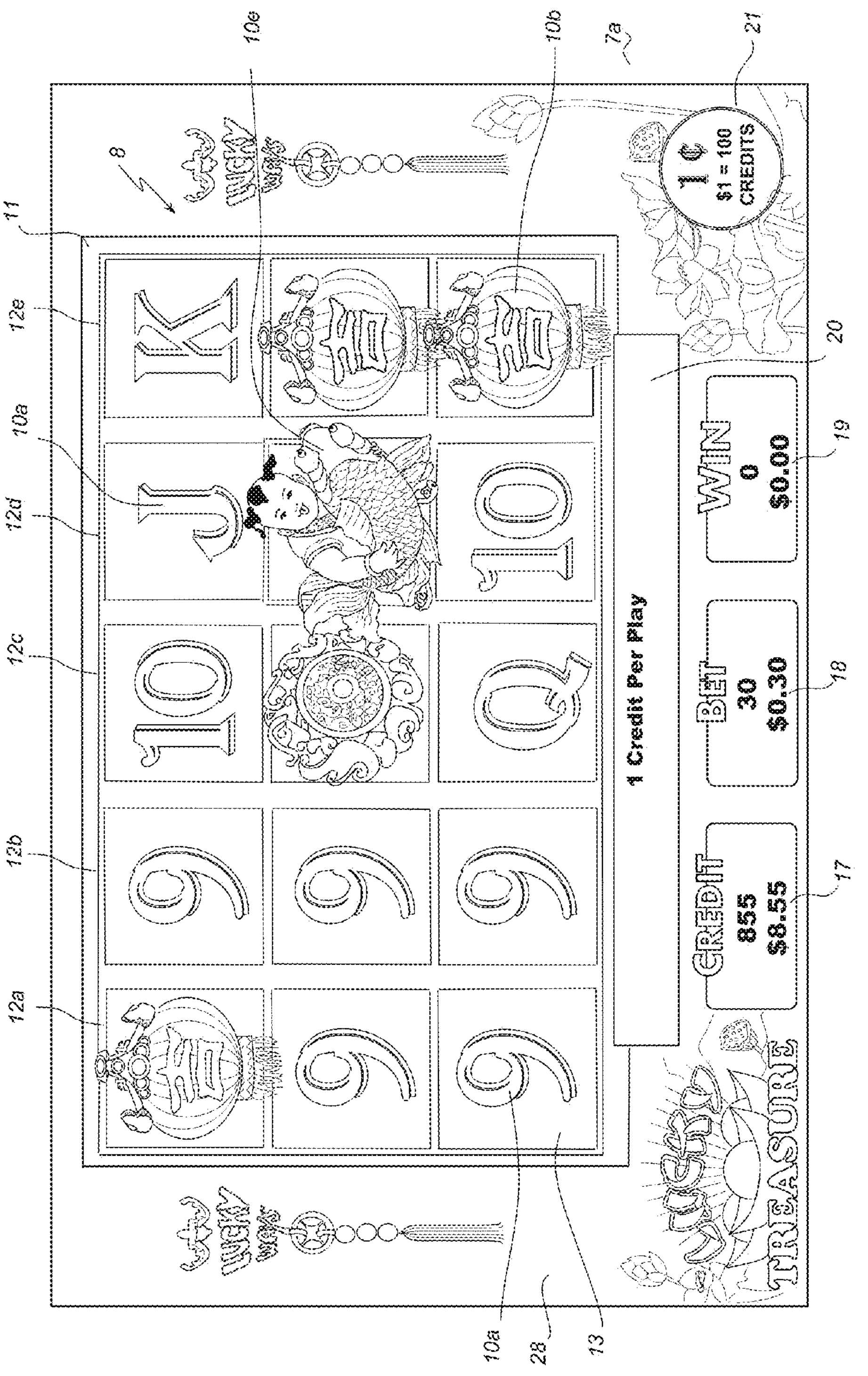
FIGS. 6A and 6B are simulated screen shots of the lower and upper parts, respectively, of the display of the electronic gaming machine of FIG. 1 illustrating the base game.
Figure 6B:
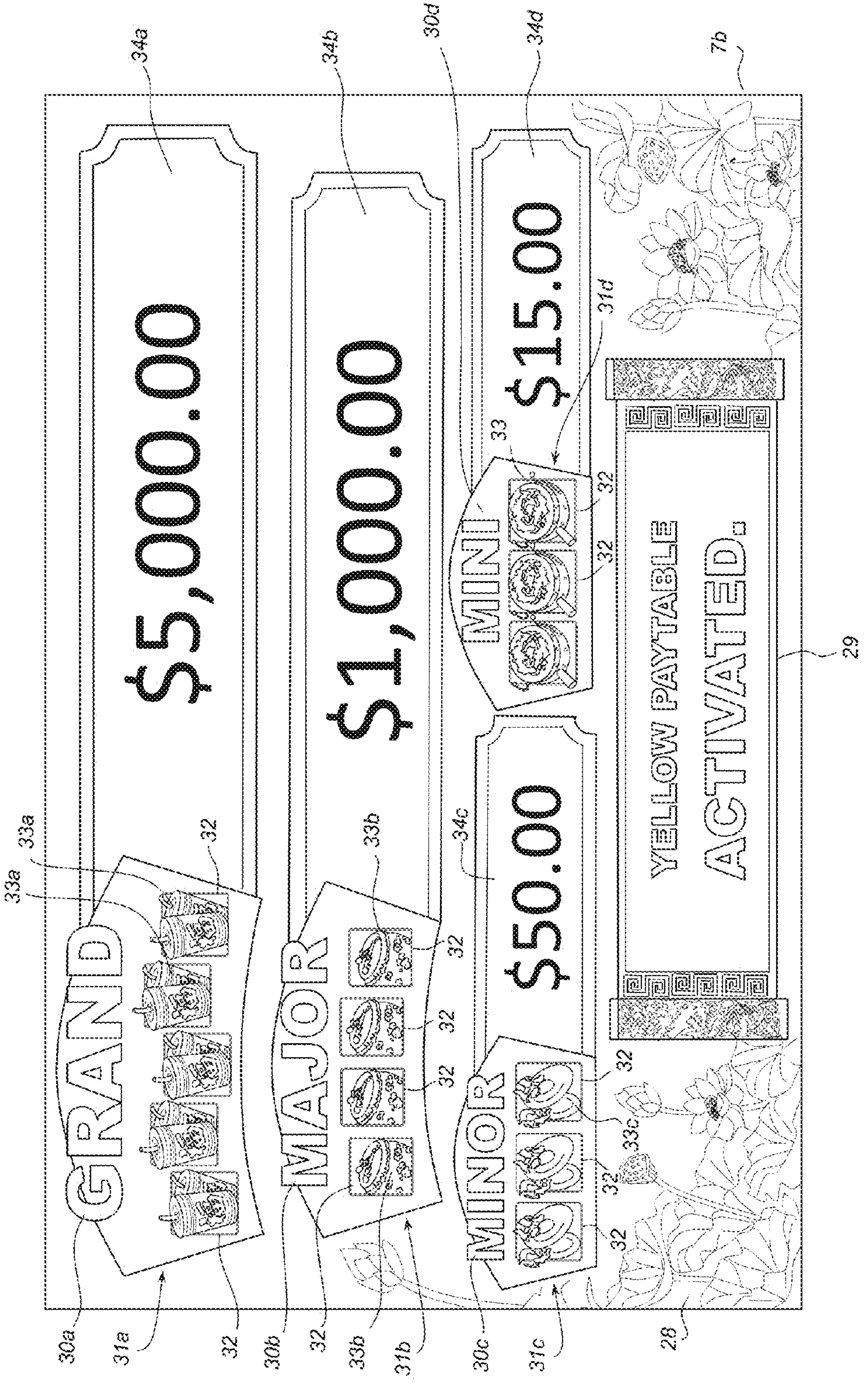
Figure 7A:
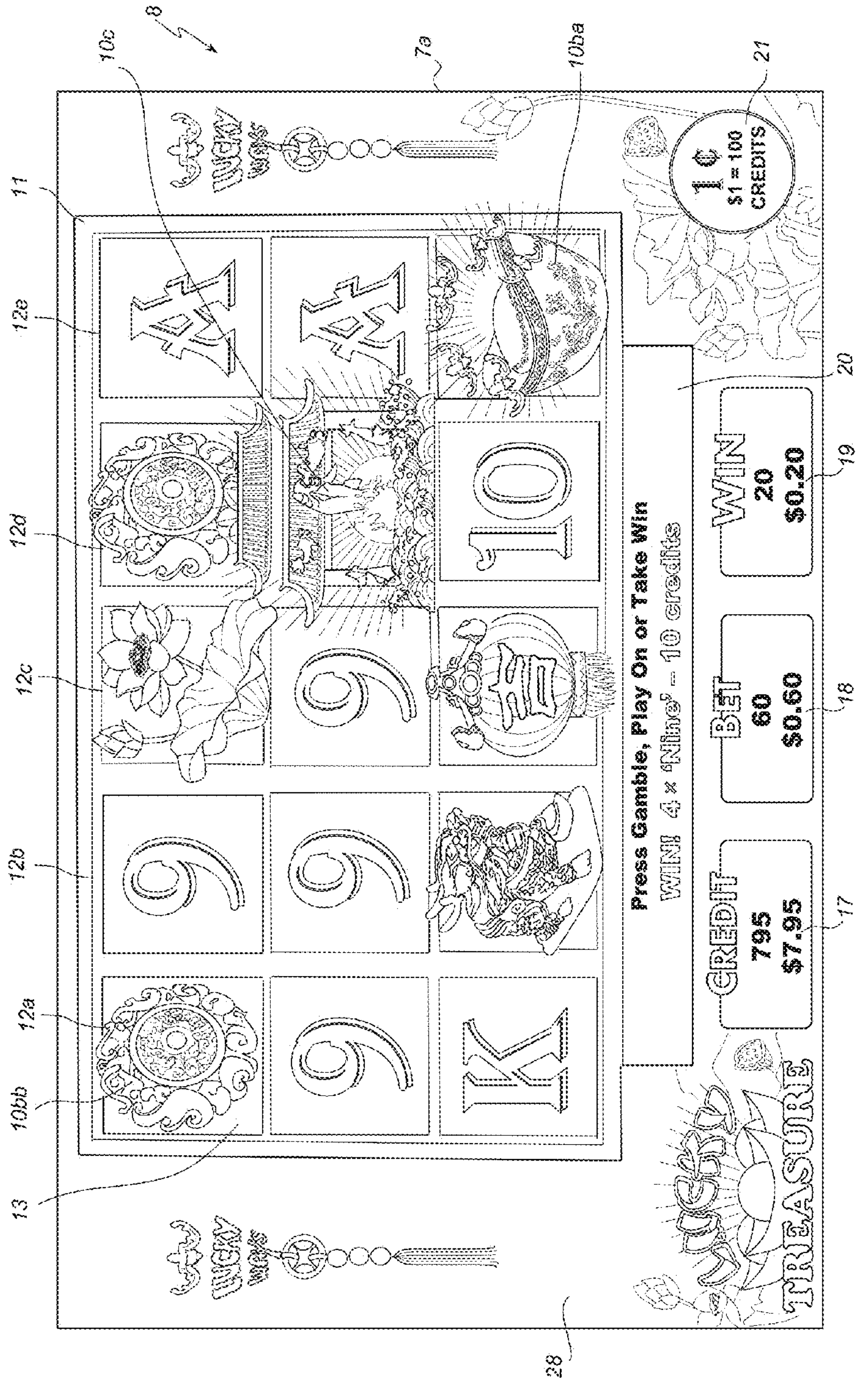
FIGS. 7A and 7B are simulated screen shots of the lower and upper parts, respectively, of the display of the electronic gaming machine of FIG. 1 illustrating the base game.
Figure 7B:
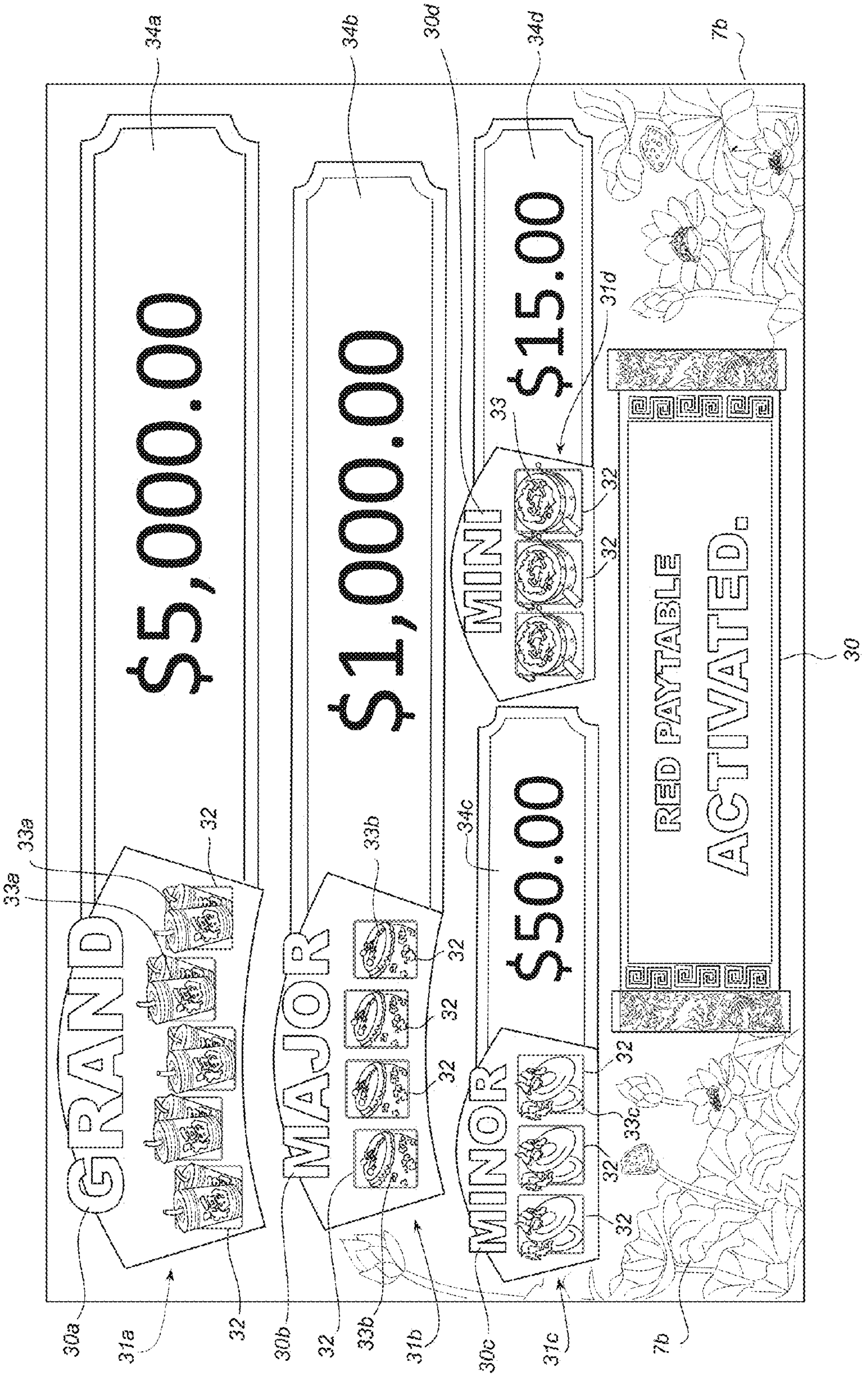

Once the player selects one of the selectable bet options, the colour associated with the selected bet option and its associated pay table are displayed in the backgrounds 28 of the lower playing area **7*a* and the upper display area 7*b* of the display 7, as shown in FIGS. 3A to 7B. Furthermore, a message 29 is initially displayed in the upper area 7*b* of the display screen 7 indicating the relevant pay table associated with the selected bet option has been activated, as best shown in FIGS. 3B, 4B, 5B, 6B and 7B. Thus, for the Play 1 selectable bet option, the backgrounds 28 of both the lower playing area 7*a* and the upper display area 7*b* are green, which reinforces the message 29 stating that the green pay table has been activated, as best shown in FIGS. 3A and 3B. Likewise, for the Play 2 selectable bet option, the backgrounds 28 of both the lower playing area 7*a* and the upper display area 7*b* are blue, which reinforces the message 29 stating that the blue pay table has been activated, as best shown in FIGS. 4A and 4B. For the Play 3 selectable bet option, the backgrounds 28 of both the lower playing area 7*a* and the upper display area 7*b* are purple, which reinforces the message 29 stating that the purple pay table has been activated, as best shown in FIGS. 5A and 5B. For the Play 4 selectable bet option, the backgrounds 28 of both the lower playing area 7*a* and the upper display area 7*b* are yellow, which reinforces the message 29 stating that the yellow pay table has been activated, as best shown in FIGS. 6A and 6B. Finally, for the Play 5 selectable bet option, the backgrounds 28 of both the lower playing area 7*a* and the upper display area 7*b* are red, which reinforces the message 29 stating that the red pay table has been activated, as best shown in FIGS. 7A and 7B. It should be noted that the background 28 in the lower player area 7*a* also includes the fields for the standard game information comprising the amount of player credits 17, the amount of the current bet wagered by the player 18, the amount of wins by the player 19 and the message area 20**.

In the upper display area **7*b*, the video display screen 7 displays jackpot information about several bonus prizes in the form of jackpots 30 associated with the base game 8 and/or electronic gaming machine 1, as best shown in FIGS. 3B, 4B, 5B, 6B and 7B. To avoid player confusion, where more than one game is provided by the electronic gaming machine 1, it is preferred that the same jackpots 30 are provided for each game. The jackpots 30 comprise a grand jackpot 30***a*, major jackpot 30*b*, minor jackpot 30*c* and a minor jackpot 30*d*. Each jackpot 30 is associated with a jackpot meter 31 that comprises an array of symbol positions 32 showing greyed out or inactive designated game symbols 33. The designated game symbols 33 are be exclusive to each of the jackpot meters 31, and comprise a firecracker symbol 33*a* exclusive to the grand jackpot meter 31*a*, a drum symbol 33*b* exclusive to the major jackpot meter 31*b*, a cymbal symbol 33*c* exclusive to the minor jackpot meter 31*c* and a rattle symbol 33*d* exclusive to the mini jackpot meter 31*d*. In other embodiments, the designated game symbols 33 are selected from the game symbols 10 of the base game 8 or a subset of game symbols 10 from the base game 8, such as for example the item-themed game symbols 10*b*. However, it will be appreciated that the designated game symbols 33 can be chosen from symbols appearing exclusively in the feature game 9 and/or the bonus game of chance 45. Prize boxes 34*a*, 34*b*, 34*c* and 34*d* list the monetary amounts of grand jackpot 30*a*, major jackpot 30*b*, minor jackpot 30*c* and a minor jackpot 30*d*, respectively.

Each of the jackpots 30 are progressive jackpot prizes. A progressive jackpot prize takes a portion of each bet (typically a set percentage of each bet) made on the electronic gaming machine and thus the amount of the progressive jackpot incrementally increases as more bets are made on the electronic gaming machine. The progressive jackpot is typically awarded when a winning game combination associated with the jackpot occurs in the game played on the electronic gaming machine. In many cases, progressive jackpots are associated with the least probable winning combination and are commonly the highest paying award of the electronic gaming machine. Alternatively, or additionally, once a certain threshold is met, either a certain amount that has been bet on the electronic gaming machine or the incremented amount of the progressive jackpot, a trigger event is activated in the electronic gaming machine to pay out the progressive jackpot prize. Progressive jackpot prizes also tend to be shared amongst multiple electronic gaming machines so as to increase the amount of the progressive jackpot prize and hence increase player interest in playing one of the electronic gaming machines. In some electronic gaming machines, more than one jackpot or progressive jackpot is offered by the electronic gaming machine or electronic gaming machines linked together.

Figure 8:
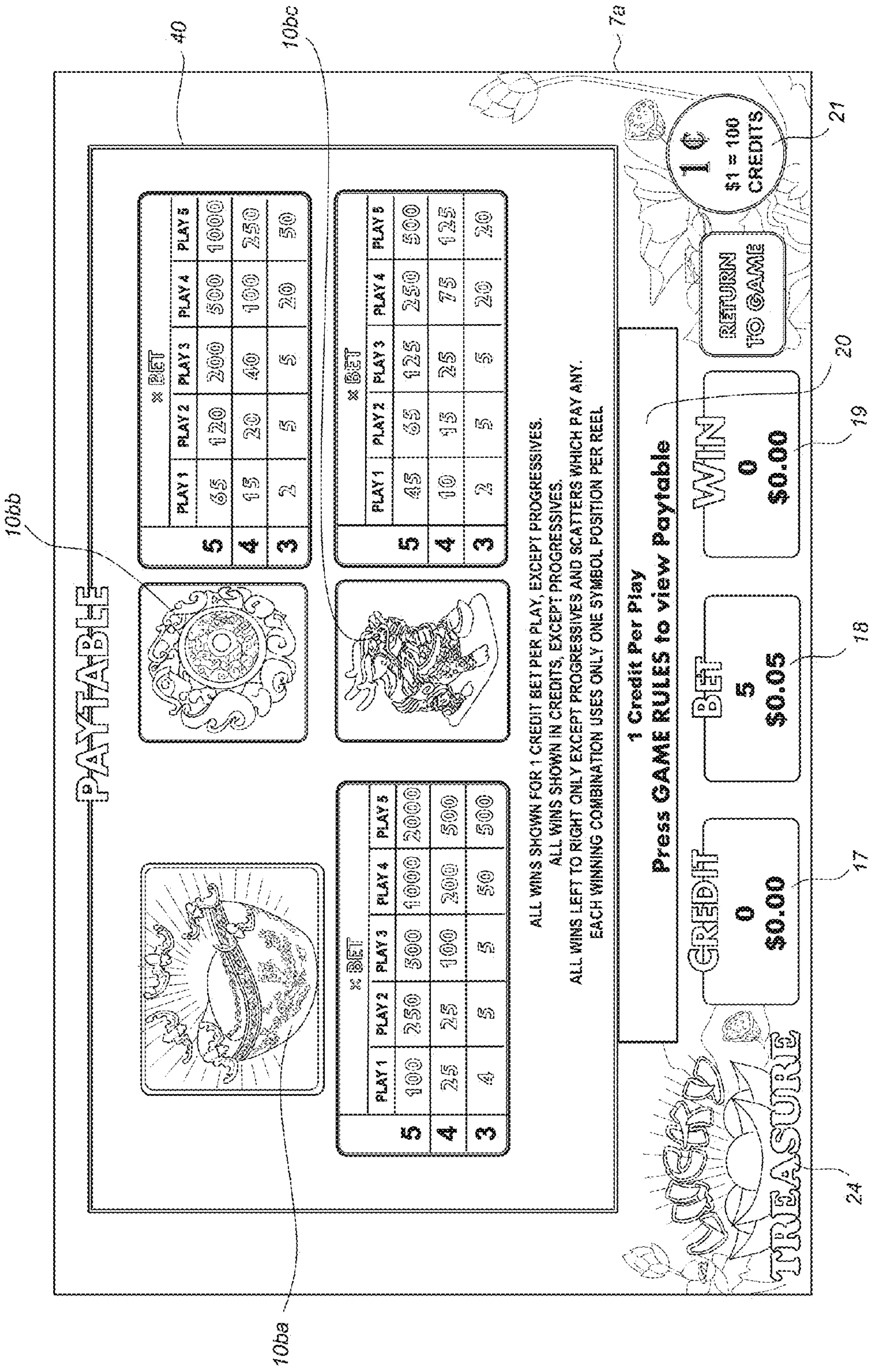
FIG. 8 is a simulated screen shot of the lower part of the display of the electronic gaming machine of FIG. 1 illustrating the pay tables for the base game.

Referring now to FIG. 8, the comparative pay tables of the selectable bet options are illustrated by way of a menu screen 40 that can be accessed on the lower playing area 7*a* by either pressing one of the buttons 6 on the console 3 and/or touching a touch sensitive button on the lower playing area 7*a*. As shown in the menu screen 40, the value of the prize awarded for the same winning combination of game symbols changes for one or more winning combinations in each of the pay tables. For example, the winning combination comprising a five of a kind of gold tael symbols 10*ba* awards a prize to the value of 100 credits for the Play 1 selectable bet option, which increases to 250 credits for the Play 2 selectable bet option, 500 credits in the Play 3 selectable bet option, 1,000 credits in the Play 4 selectable bet option and 2,000 credits in the Play 5 selectable bet option. The increases in the pay tables for each of the selectable bet options is not linear as the increase in the amount of the bet from the Play 1 to play 2 selectable bet option is by a factor of 2 (from 5 credits to 10 credits), whereas in the pay tables, the prize value for five of a kind of the gold tael symbols 10*ba* is increased by 2.5 (from 100 credits to 250 credits). It is noted that for other prizes, such as four of a kind of the gold tael symbols 10*b* there is no change in the prize value of 25 credits in both the play 1 and play 2 selectable bet options. Incremental increases occur for the three of a kind winning combination between the Play 1 and Play 2 selectable bet options. Similar changes in the value of the prizes as the selectable bet option increases occur for other winning combinations such as the gold shield symbols 10*bb* and the silver lion symbol 10*bc*, as illustrated in the pay table menu screen 40.

After the player has chosen one of the selectable bet options (and hence chosen a particular pay table corresponding to the selected bet option) and one of the Credit bet per Play options, the electronic game controller 4 also assigns a number of the Lucky Boy scatter symbols 10*e* to the respective strips for each of the reels 12*a* to 12*e*, depending on the bet option selected by the player. The higher the bet value associated with the selected bet option, the greater the number of Lucky Boy scatter symbols 10*e* is allocated to the reel strips, thus increasing the probability of the Lucky Boy scatter symbol 10*e* appearing on the reels 12*a* to 12*e*. This also increases the probability of activating a bonus game of chance 45 and the feature game 9 because in this embodiment the appearance of three Lucky Boy scatter symbols 10*e* is the trigger event for triggering both the feature game 9 and the bonus game of chance 45. In other embodiments, the trigger events for the feature game 9 and the bonus game 45 are separate events, with the assignment of special symbols like the Lucky Boy scatter symbols 10*e* affecting the probability of activating or triggering the bonus game of chance 45. In another embodiment, another type of special symbol is assigned to the reel strips as described above to provide a separate probability for triggering or activating the feature game 9. Hence, the probability of winning or activating the feature game 9 and the bonus game of chance 45 is proportional to the amount of the bet value as represented by the selectable bet option. Thus, a player selecting the Play 3 selectable bet option is more likely to activate the feature game 9 and the bonus game 45 than if he or she were to select the Play 1 selectable bet option. As the Play 5 selectable bet option represents a maximum bet, in this embodiment the selection of this bet option will guarantee that the bonus game 45 is activated, as well as triggering the feature game 9 in the base game 8.

The electronic game controller 4 then transmits a signal to the display 7 to cause the reels 12 to appear to visibly rotate or "spin" in a linear path, typically in a downward vertical direction, and randomly display the game symbols 10 in each symbol position 13 for each play of the array 11 for the base game 8. After the reels 12 stop spinning, the electronic game controller 4 determines whether there are any predetermined winning combinations of the game symbols 10 appearing in any player-selected pay lines 14, such as a two of a kind, three of a kind, four of a kind or five of a kind for all the game symbols 10 and other combinations of a "full house", "straight" or "flush" for the playing card game symbols 10*a*. It will be appreciated that other winning combinations of game symbols 9 can also be provided. If so, the gaming machine 1 enters a winning game state and awards a prize according to the displayed predetermined winning combination.

The electronic game controller 4 also determines whether the feature game 9 and bonus game 45 should be activated, based on the trigger event of three Lucky Boy symbols 10*e* appearing in a play or spin of the base game 8. The three Lucky Boy scatter symbols 10*e* need not appear on the same pay line 14, but can appear on any of the player-selected pay lines.

Figure 9A:
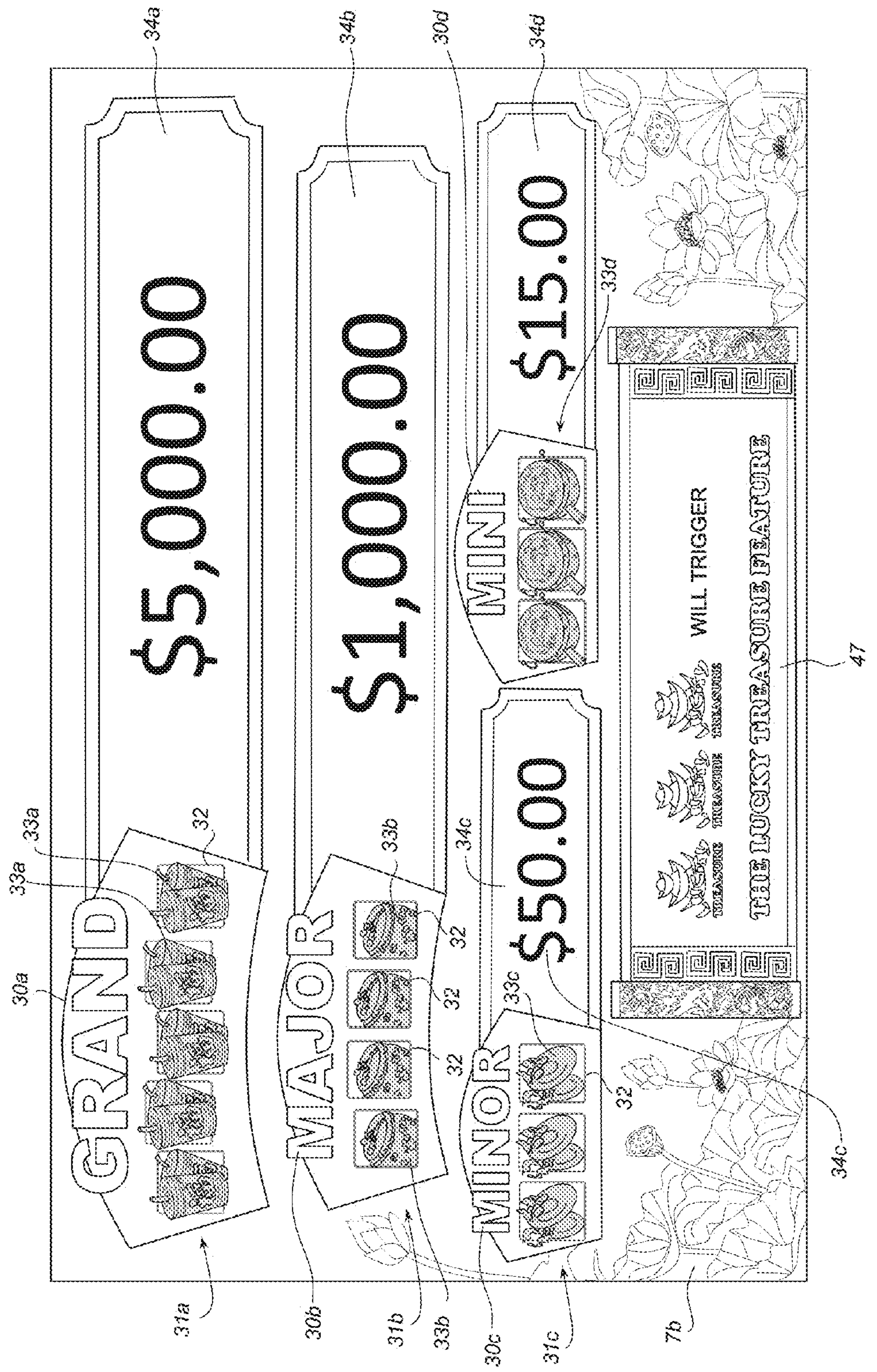
FIGS. 9A and 9B are simulated screen shots of the upper part of the display of the electronic gaming machine of FIG. 1 illustrating a bonus game of chance.
Figure 9B:
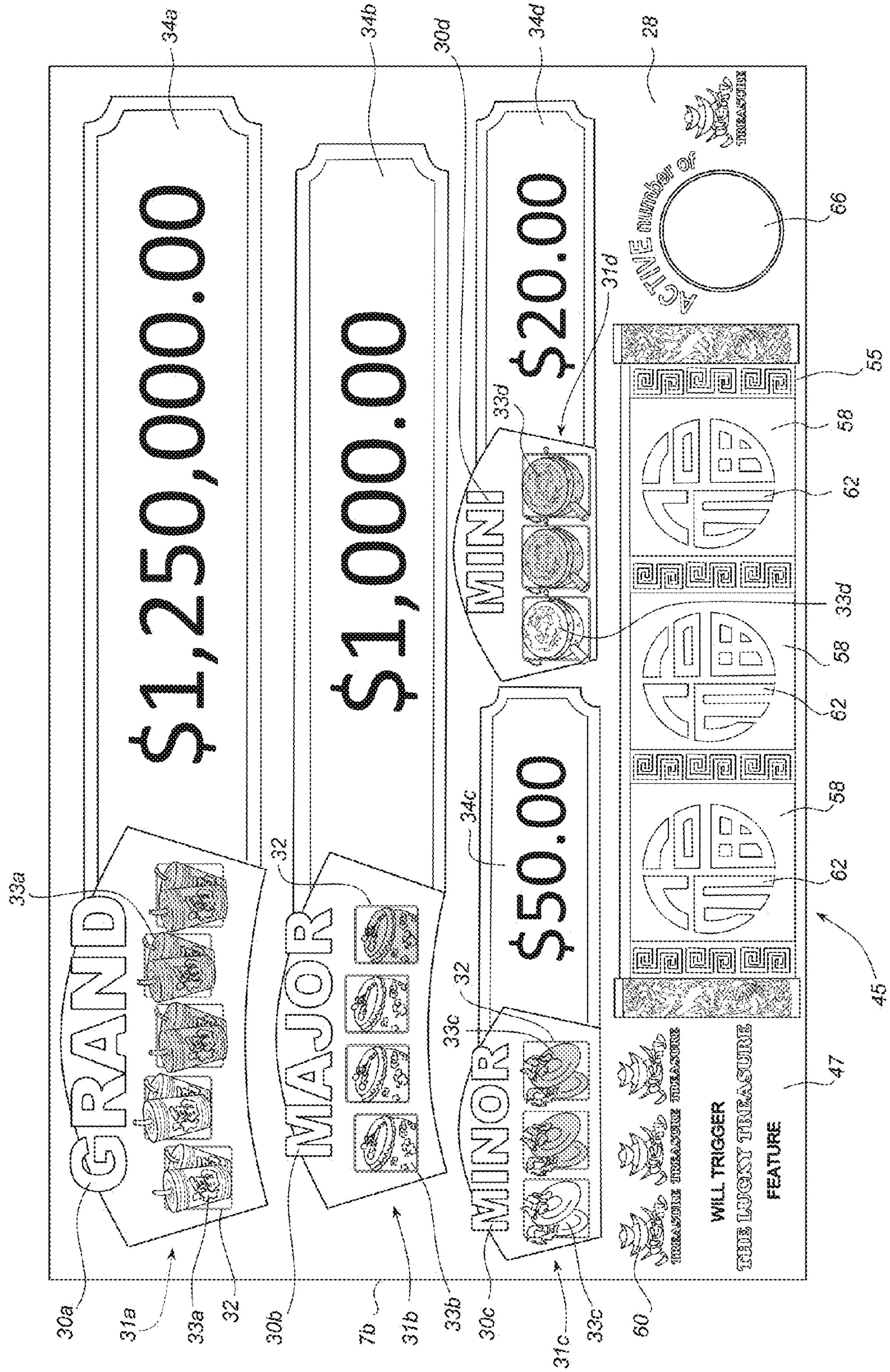
Figure 9C:
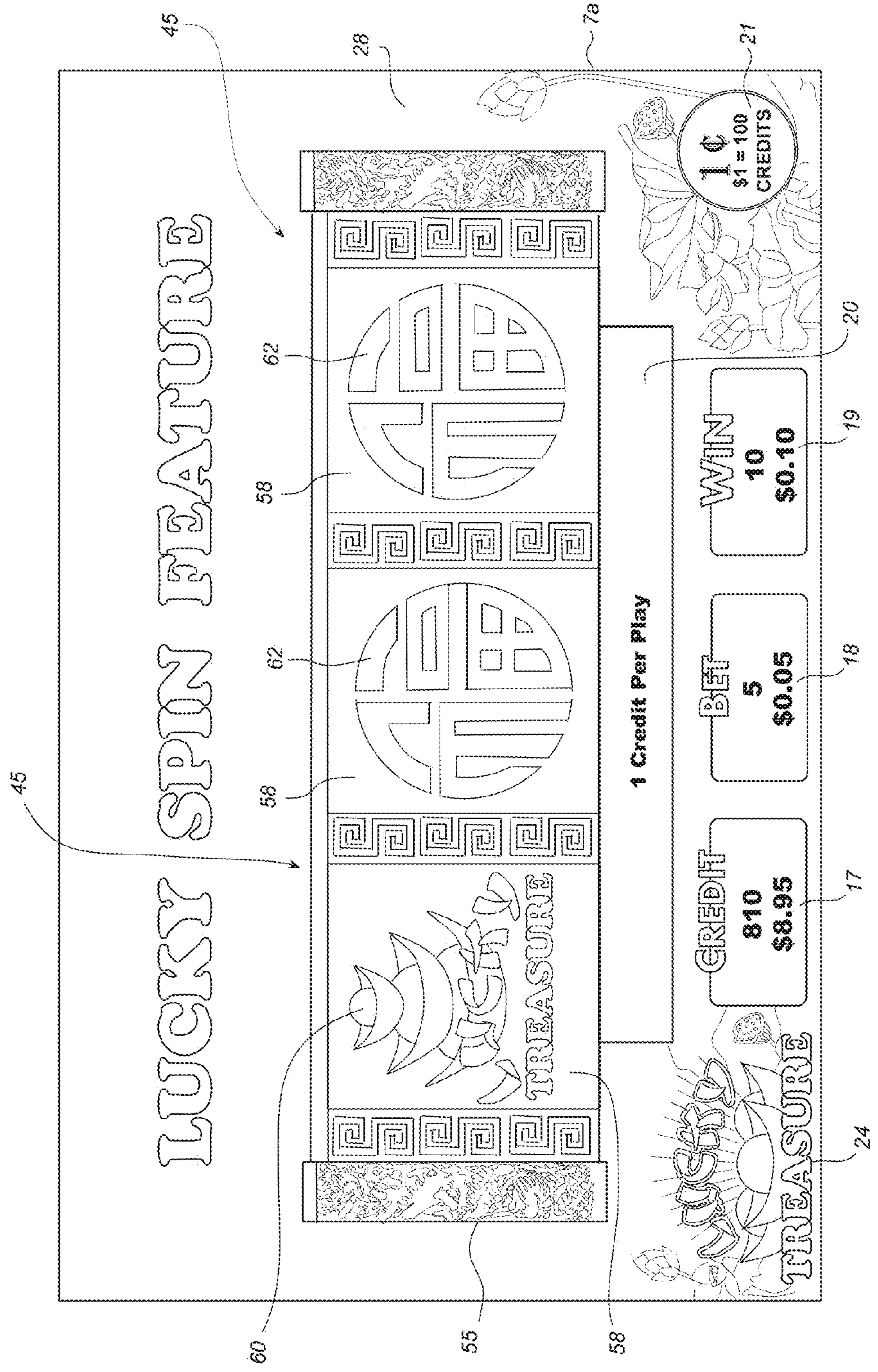
FIG. 9C is a simulated screen shot of the lower part of the display of the electronic gaming machine of FIG. 1 as an alternative or in addition to FIGS. 9A and 9B.

In response to the trigger event, the electronic game controller 4 transmits a signal to the video screen 7 to cause the bonus game of chance 45, named the "Lucky Spin Feature", to appear in the upper display area 7*b*, as best shown in FIGS. 9A and 9B. A message 47 appears below the jackpots 30*a* to 30*d* advising the player the winning outcome of the bonus game of chance 45 that will in turn activate a jackpot prize selection game 49, named the "Lucky Treasure Feature" in this embodiment. In other words, playing the bonus game 45 determines whether the player wins one of the jackpots 30 and the jackpot prize selection game 49 determines which of the jackpots 30*a* to 30*d* is won by the player. Referring to FIG. 9B, in the bonus game 45, an array 55 is shown in the upper screen 7*b* just below the jackpots 30*a* to 30*d*. The array 55 comprises of three symbol positions 58, which can display either a Lucky Treasure symbol 60 or a game symbol 62. The bonus game 45 comprises a single free spin of the array 55. The appearance of three Lucky Treasure symbols 60 in the array 55 will result in the awarding one of the jackpot prizes 30*a* to 30*d* to the player. Also, the accumulation of three Lucky Treasure symbols 60 will result in the awarding one of the jackpot prizes 30*a* to 30*d* to the player. This can occur where the player triggers the bonus game 45 in play or spin of the base game 8 and only obtains a single Lucky Treasure symbol 60 and then activates the bonus game 45 again during another play of the base game 8 and obtains further Lucky Treasure symbols 60. A "soft" meter 66 is shown adjacent to the array 55 that counts the number of Lucky Treasure symbols 60 that are accumulated by the player each time the bonus game 45 is played. Once the player reaches the predetermined threshold of three Lucky Treasure symbols 60, this result in the award of one of the jackpots 30, to be determined later in the jackpot prize selection game 49. In other embodiments, the bonus game of chance 45 is played in the lower playing area 7*a* of the display, as best shown in FIG. 9C. In another embodiment, the bonus game of chance 45 is displayed in both the upper display area 7*b* and the lower playing area 7*a* (i.e. the same bonus game of chance 45 is shown and played in both areas 7*a* and 7*b*, which would appear as a combination of FIGS. 9B and 9C).

Figure 10:
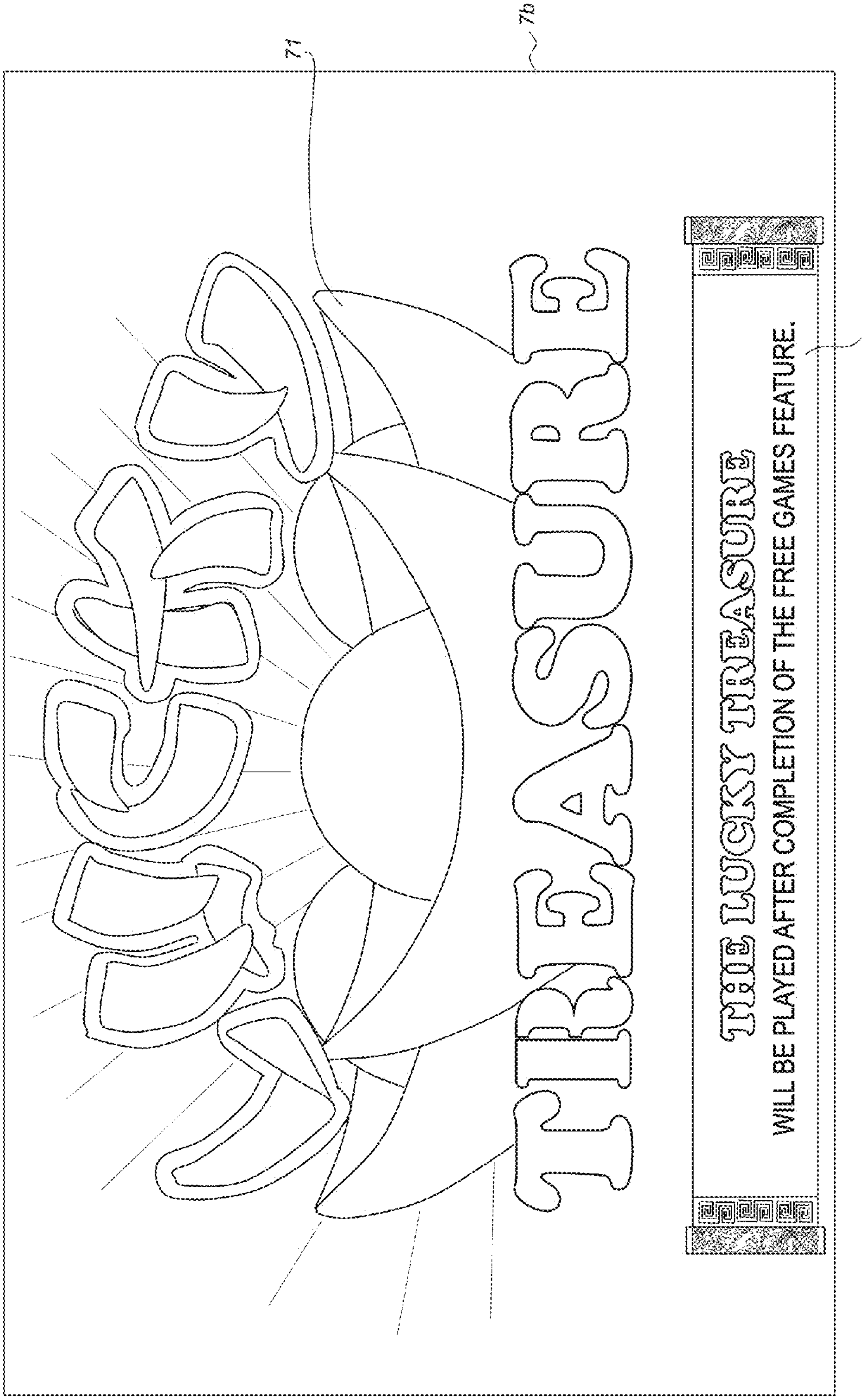
FIG. 10 is a simulated screen shot of the upper part of the display of the electronic gaming machine of FIG. 1.

After the bonus game of chance 45 is played, and if a jackpot 30 has been won, then the upper display area 7*b* will show a message 70 advising the player that while the bonus game 45 has been won, the jackpot prize selection game 49 will be played after completion of the feature game 9, as best shown in FIG. 10. A striking visual image 71 is also shown in the upper display area 7*b* to reinforce the message 70. The message 70 and image 71 are shown in the upper display area 7*b* during play of the feature game 9.

The electronic game controller 4 then transmits a signal to the video screen 7 to cause the feature game 9 to appear on the video screen 7, as best shown in FIGS. 11A and 11B. The feature game 9 also uses the same game symbols 10 as the base game 8, as well as the same array 11, reels 12*a* to 12*e*, symbol positions 13 and player-selectable pay lines 14 on the video screen 7. In the feature game 9, ten free plays or spins of the feature game are awarded to the player without having to make an additional bet or wager. It will be understood by those skilled in the art that a free play or spin involves a play of the game without requiring any bet to be made by the player, and that any number of free spins can be chosen for the feature game. In addition, it will be appreciated that in the art free plays or spins are commonly referred to as "free games". The number of free games remaining in the feature game 9 is indicated by a counter 75.

As best shown in FIG. 11A, in the feature game 9 a sixth reel 77 is added to the array 11 and adjacent to the reel 12*e*. The additional sixth reel 77 only shows multipliers, such as ×2 or ×3, and "blanks" or empty symbol positions. The multipliers increase the value of any prizes won for winning combinations appearing on the reels 12*a* to 12*e* in the feature game 9 when they appear on the sixth reel 77. The increase in prize value is obtained by multiplying the prize value for the stated multiplier value. A message bar 80 states the types of multipliers that may be shown, which in this case for the Play 5 selectable bet option comprises multipliers of ×3, ×5, ×8, ×10 and ×12. The frequency and range of multipliers shown in the sixth reel 77 also changes depending on the selected Credits bet per Play option. In this embodiment, the higher the bet value associated with the chosen selectable Credits bet per Play option, the higher the frequency or probability of a multiplier appearing in the sixth reel 77 and the higher the multiplier values that can be obtained. For example, if the player chooses the 1 credit bet per Play option, then in the feature game 9 the sixth reel 77 will only show a ×1 multiplier (in effect no multiplier is applied), whereas the 3 credits bet per Play option provides the range of ×2, ×3, ×5 and ×8 multipliers that may appear in the sixth reel 77.

Figure 12A:
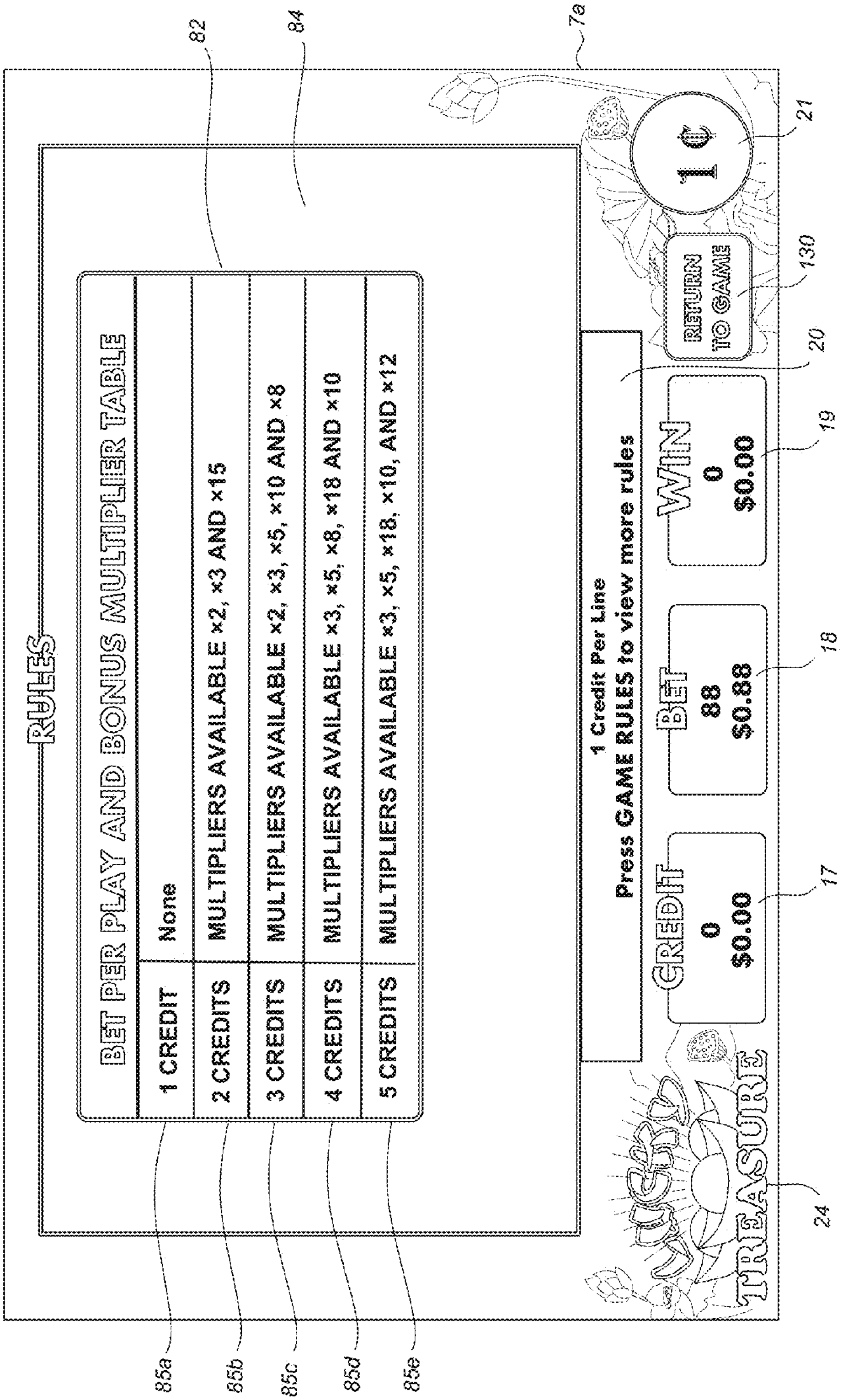
FIGS. 12A and 12B are simulated screen shots of the lower part of the display of the electronic gaming machine of FIG. 1 illustrating the multipliers for the feature game of FIGS. 11A and 11B.
Figure 12B:
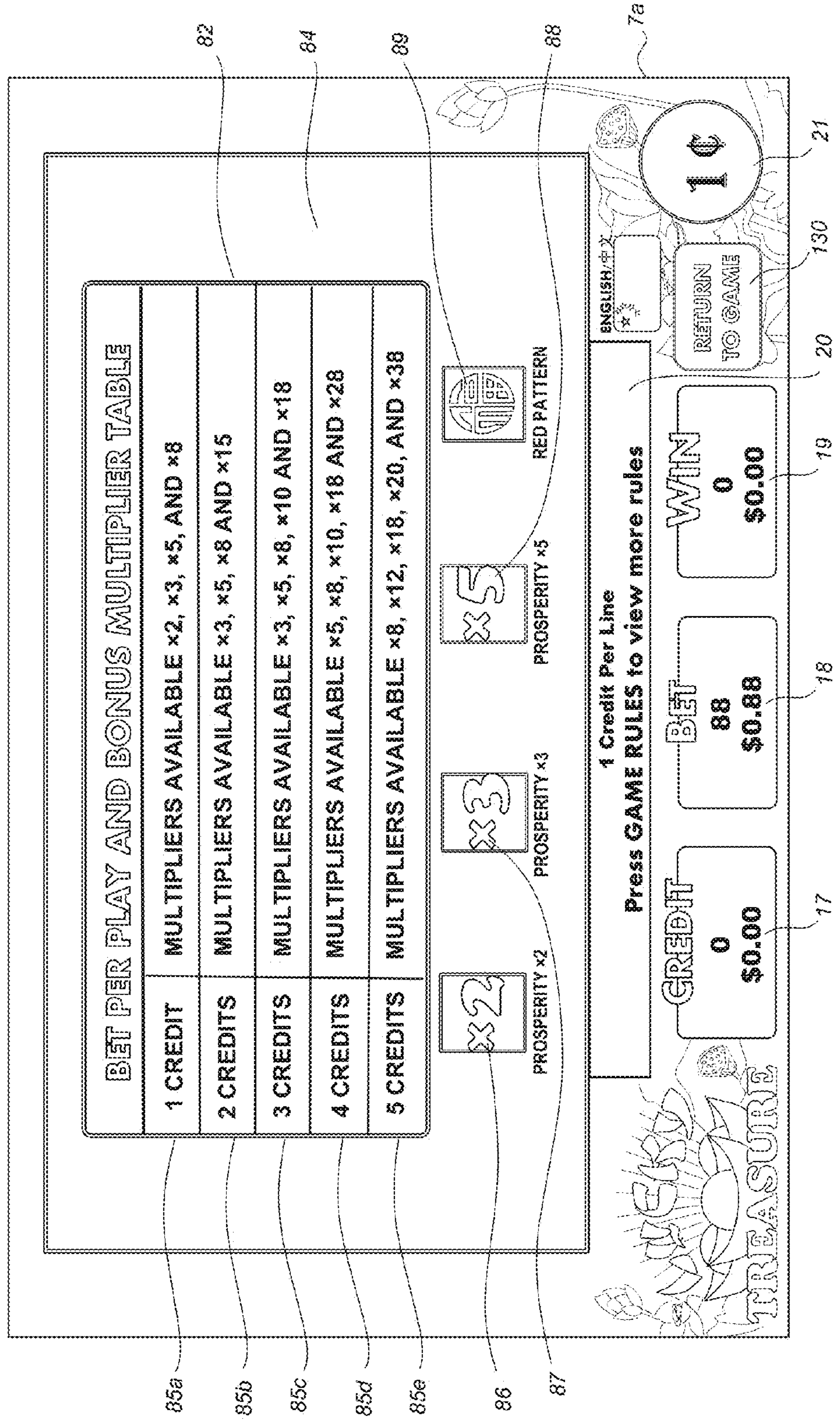

The ranges of multipliers that are provided for each Credits bet per Play option are shown in a table 82 of a rules screen 84 on the lower playing area 7*a* of the video screen 7, as best shown in FIG. 12A. The table 82 has listed amounts 85*a*, 85*b*, 85*c*, 85*d* and 85*e* corresponding to the 1 credit bet per Play option, 2 credits bet per Play option, 3 credits bet per Play option, 4 credits bet per Play option and 5 credits bet per Play option, respectively. In other embodiments, different ranges of multipliers are used for the sixth reel 77 for the selectable bet options in the feature game 9. In the embodiment shown in FIG. 12B, the table 82 has the same listed Credit bet per Play options 85*a* to 85*e*, but each of the amounts are associated with multipliers of higher value than the multipliers in the table 82 of FIG. 12A. For example, the 1 credit bet per Play option 85*a* in table 82 of FIG. 12A has no multipliers, whereas the 1 credit bet per Play option 85*a* in table 82 of FIG. 12B has three multipliers—×2, ×3, ×5 and ×8. Likewise, the 5 credits bet per Play option 85*e* in table 82 of FIG. 12A has a range of ×3, ×5, ×18, ×10 and ×12 multipliers, whereas the 5 credits bet per Play option 85*e* in table 82 of FIG. 12B has a range of ×8, ×12, ×18, ×20 and ×38 multipliers.

Also, the sixth reel 77 may show special multiplier symbols 86 to 88, being Prosperity ×2 symbol 86, Prosperity ×3 symbol 87 and Prosperity ×5 symbol 88, as well as a red pattern symbol 89. Each of the Prosperity symbols 86 to 88 confer multipliers of ×2, ×3 and ×5 in addition to those listed in the table 82, while the red pattern symbol 89 acts as a "blank" symbol that has no effect. In some embodiments, the sixth reel 77 shows game symbols 10 for the feature game 9 to extend the pay lines 14, and hence increase the chance or probability of the player obtaining or achieving a winning combination of game symbols 10 on the array 11.

During the free spins of the reels 12 and 77 in the feature game 9, any winning combinations of game symbols 10 on the reels 12 are awarded prizes according to the coloured pay table associated with the selectable bet option chosen for the base game 8. Any multipliers shown in the sixth reel 77 then multiply the value of any awarded prizes by the multiplier value. Where more than one multiplier is shown in the sixth reel 77, then the multiplier values are added together to provide a cumulative multiplier value that is applied to any awarded prizes. In other embodiments, the multiplier values are multiplied together. In a further embodiment, only the highest multiple value is applied to the awarded prizes. In addition, the appearance of two Lucky Boy scatter symbols 10*e* on the reels 12*a* to 12*e* will retrigger the feature game 9 that results in further free plays of the feature game. Upon conclusion of the feature game 9, a message bar 90 will appear to prompt the player to proceed to the jackpot prize selection game 49 by pressing a "start feature" button, as best shown in FIG. 11B.

Figure 13A:
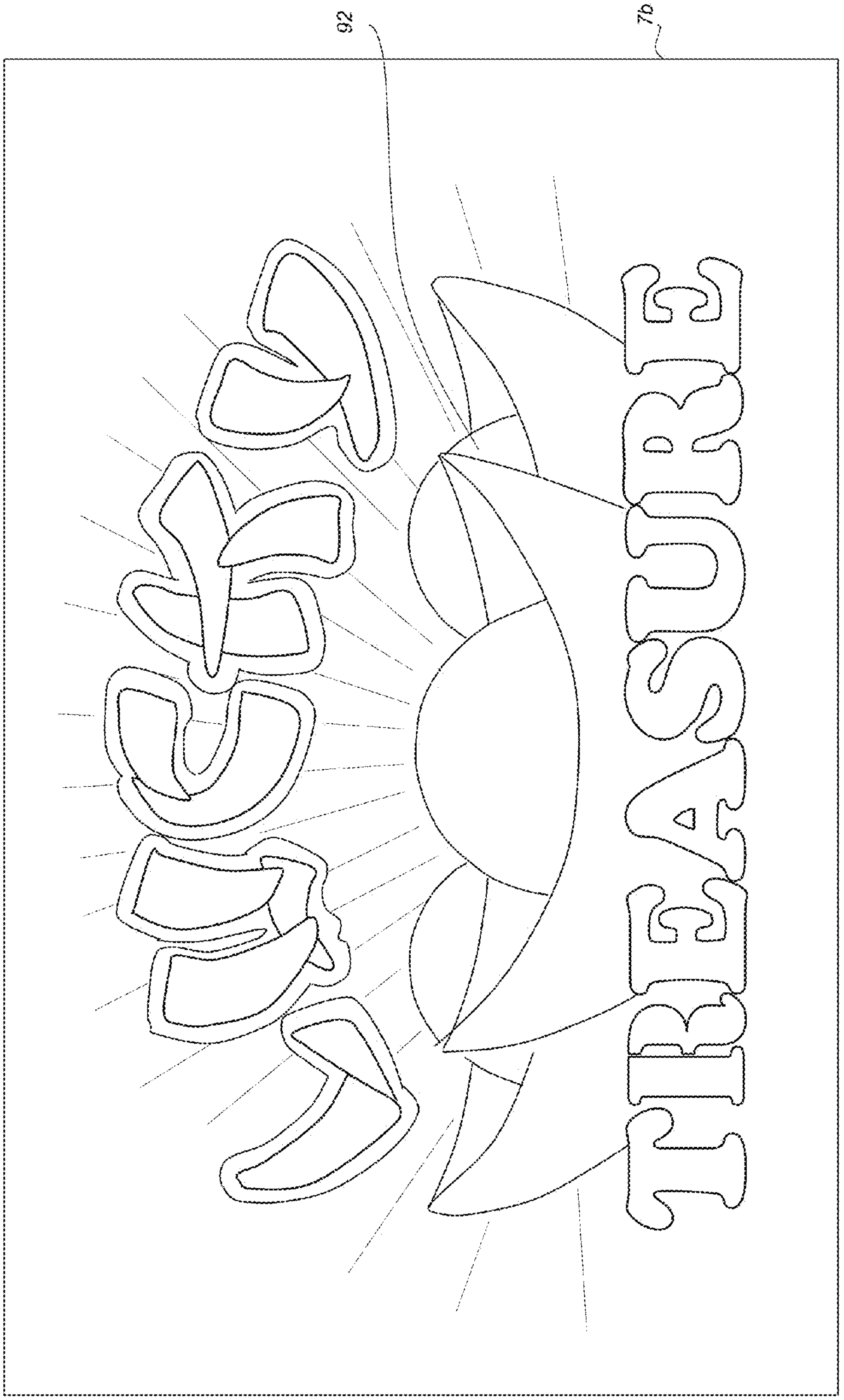
FIGS. 13A and 13B are simulated screen shots of the lower and upper parts, respectively, of the display of the electronic gaming machine of FIG. 1 illustrating the initial screen for a jackpot selection prize game.
Figure 13B:
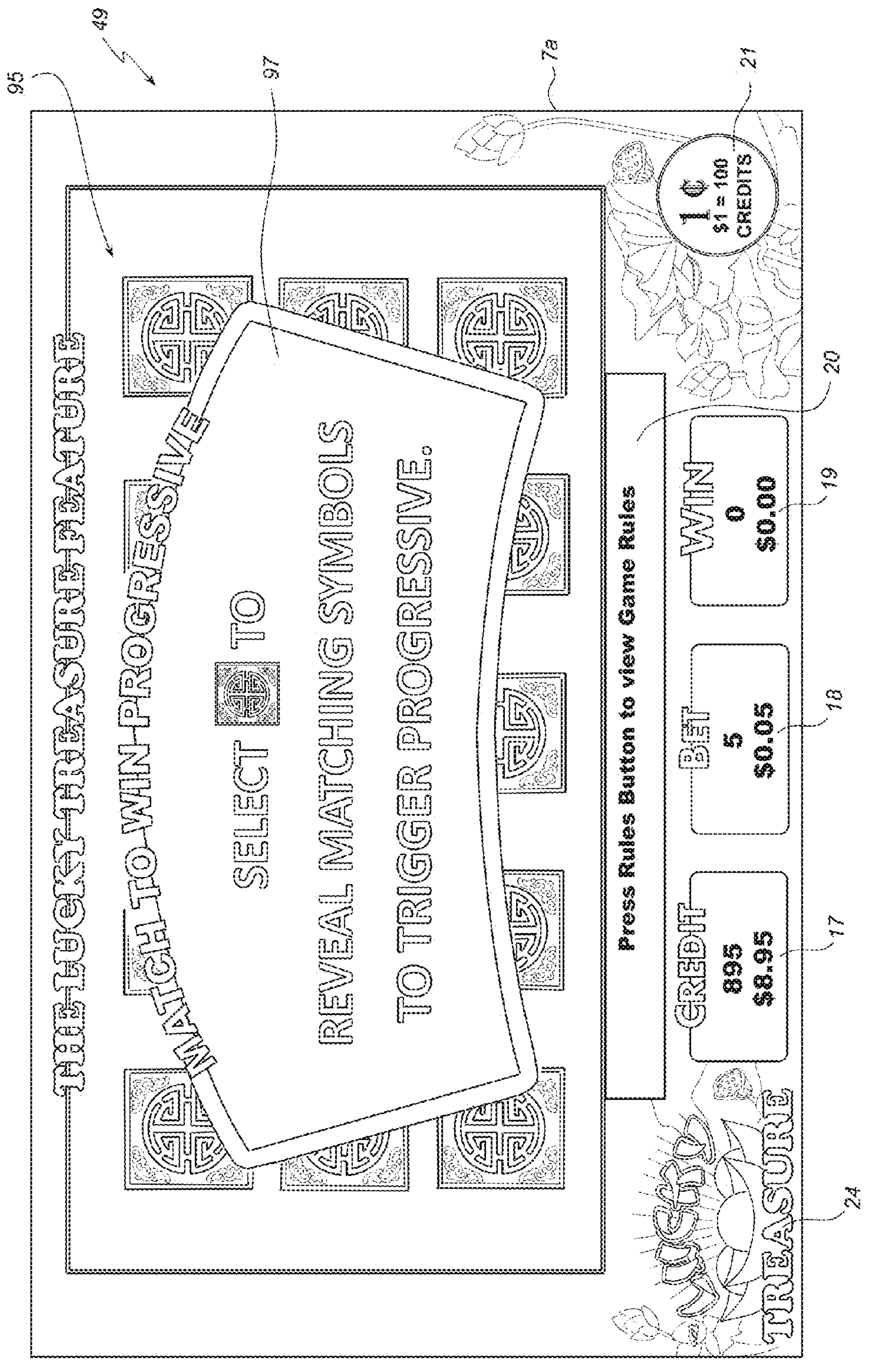

Referring to FIGS. 13A and 13B, once the player presses the start feature button (being either one of buttons 6 on the console 3 or a virtual button on the video screen 7), the electronic game controller 4 transmits a signal to the video screen 7 to display the jackpot prize selection game 49. The upper display area 7*b* will show a title image 92 for the jackpot prize selection game 49 (as best shown in FIG. 13A) while the lower playing area 7*a* will show an array 95 for playing the jackpot prize selection game 49 (as best shown in FIG. 13B). Initially, a message 97 will be superimposed over the array 95 instructing the player how to play the jackpot prize selection game 49.

Figure 14A:
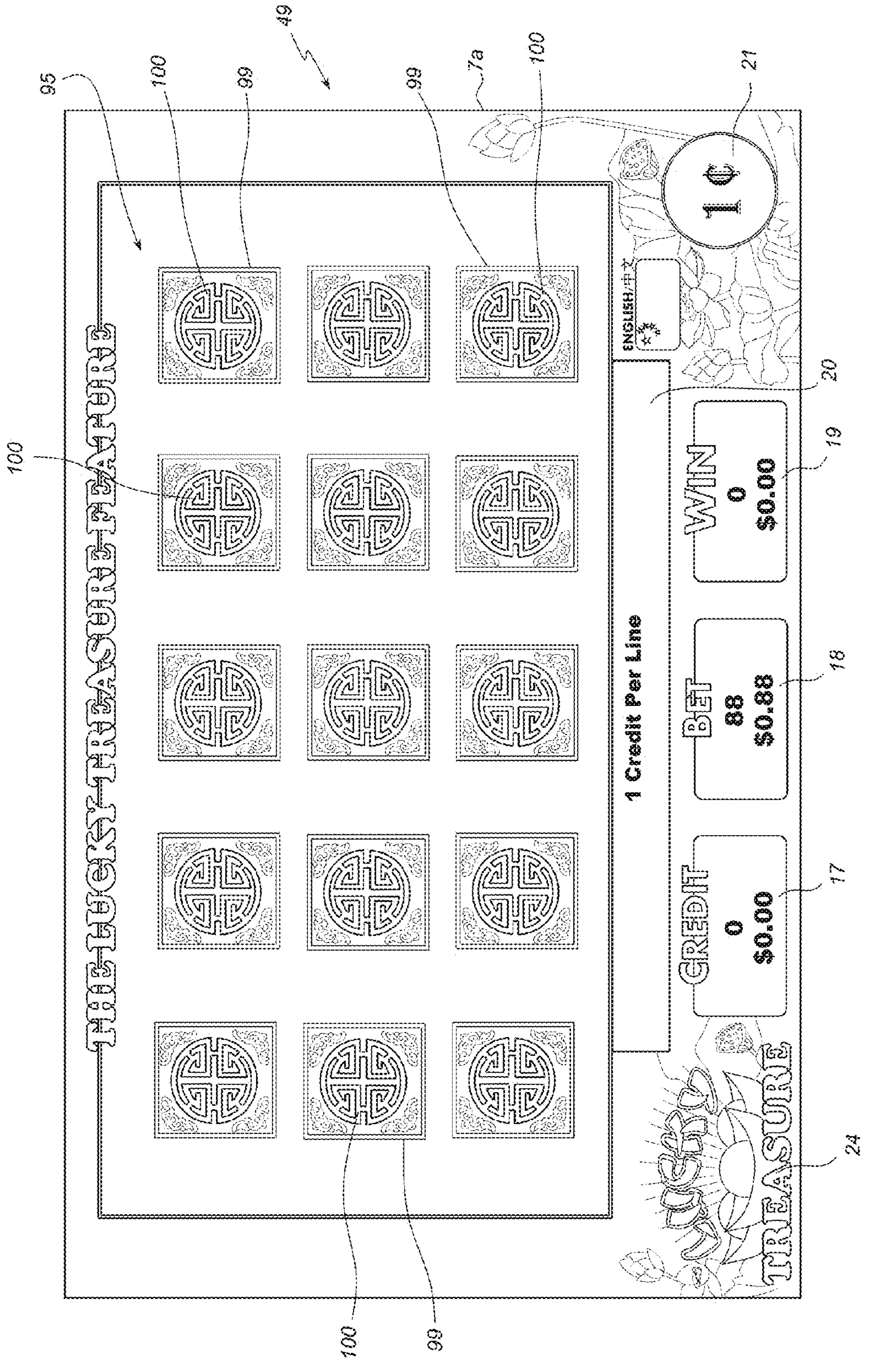
FIGS. 14A and 14B are simulated screen shots of the lower and upper parts, respectively, of the display of the electronic gaming machine of FIG. 1 illustrating the jackpot selection prize game.
Figure 14B:
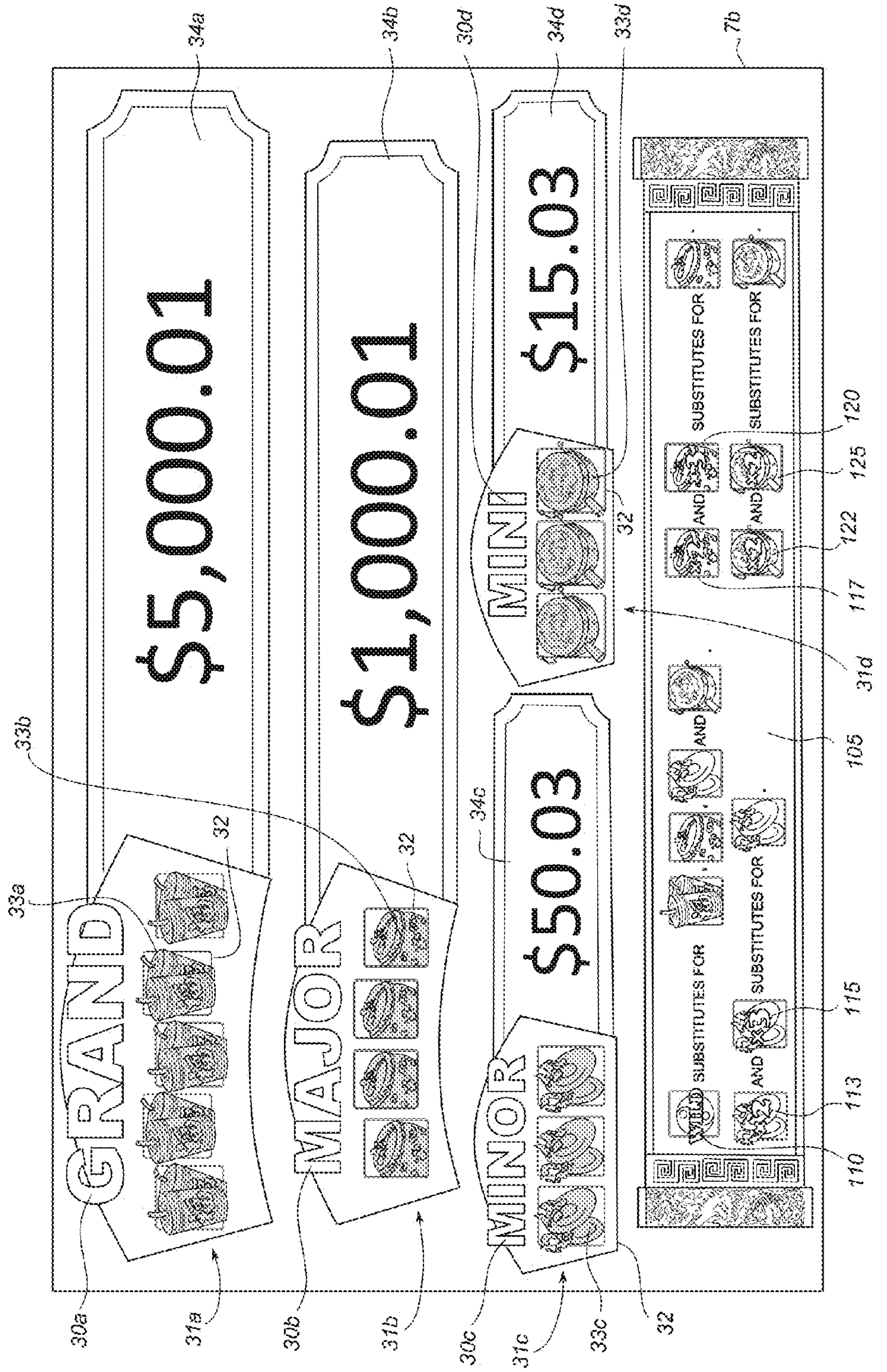

As best shown in FIGS. 14A and 14B, the message 97 will disappear and the array 95 becomes available for play. In the jackpot prize selection game 49, the array 95 comprises fifteen symbol positions 99 showing "banner" symbols 100 that are exclusive to the jackpot prize selection game 49. The player selects banner symbols 100 one by one using a touch screen interface on the display screen 7 to reveal symbols underneath. If the revealed game symbol is one of the inactive or greyed out symbols 33*a* to 33*d* in one of the jackpot meters 31 (as shown in FIG. 14B), then the relevant jackpot meter 31 will increment by one. This increase in the jackpot meter 31 is shown by rendering one of the inactive or greyed out symbols 33 in colour to indicate that it is active.

Aside from the designated game symbols 33, there are also other revealed game symbols that may be used to fill the jackpot meters 31, as best shown in FIG. 14B. A message bar 105 in the upper display area 7*b* below the jackpots 30*a* to 30*d* advises that in addition to the designated game symbols 33*a* to 33*d*, a substitute symbol in the form of a ying-yang WILD symbol 110 and multiplier symbols 113, 115, 117, 120, 122 and 125 can be used to fill one or more of the jackpot meters 31*a* to 31*d*. The yin-yang WILD symbol 110 when revealed underneath a banner symbol 100 causes each of the jackpot meters 31*a* to 31*d* to increment by one, which is shown by filling in one symbol position 32 for each jackpot meter 31*a* to 31*d* with a colour version of their respective designated symbols 33*a* to 33*d*. Of the multiplier symbols, the ×2 cymbal symbol 113 and the ×3 cymbal symbol 115 fills the jackpot meter 31*c* by one, as well as multiplying the value in the prize box 34*c* by 2 and 3, respectively, if the jackpot meter 31*c* for the minor jackpot 30*c* is filled. Likewise, the ×2 drum symbol 117 and the ×3 drum symbol 120 fills the jackpot meter 31*b* by one, as well as multiplying the value in the prize box 34*b* by 2 and 3, respectively, if the jackpot meter 31*b* for the major jackpot 30*b* is filled. Similarly, ×2 rattle symbol 122 and the ×3 rattle symbol 125 fills the jackpot meter 31*d* by one, as well as multiplying the value in the prize box 34*d* by 2 and 3, respectively, if the jackpot meter 31*d* for the mini jackpot 30*d* is filled.

Figure 15A:
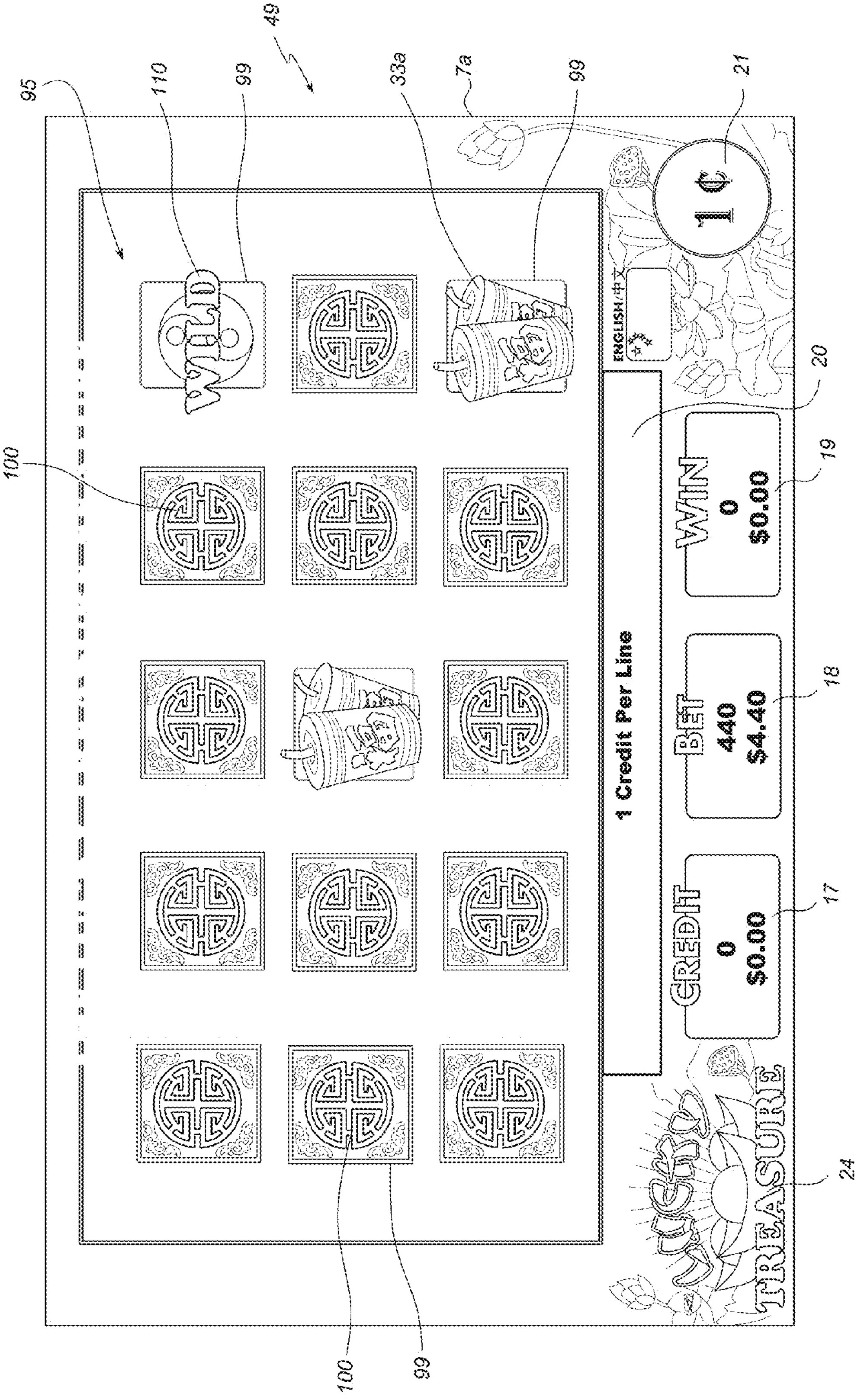
FIGS. 15A and 15B are simulated screen shots of the lower and upper parts, respectively, of the display of the electronic gaming machine of FIG. 1 illustrating the jackpot selection prize game.
Figure 15B:
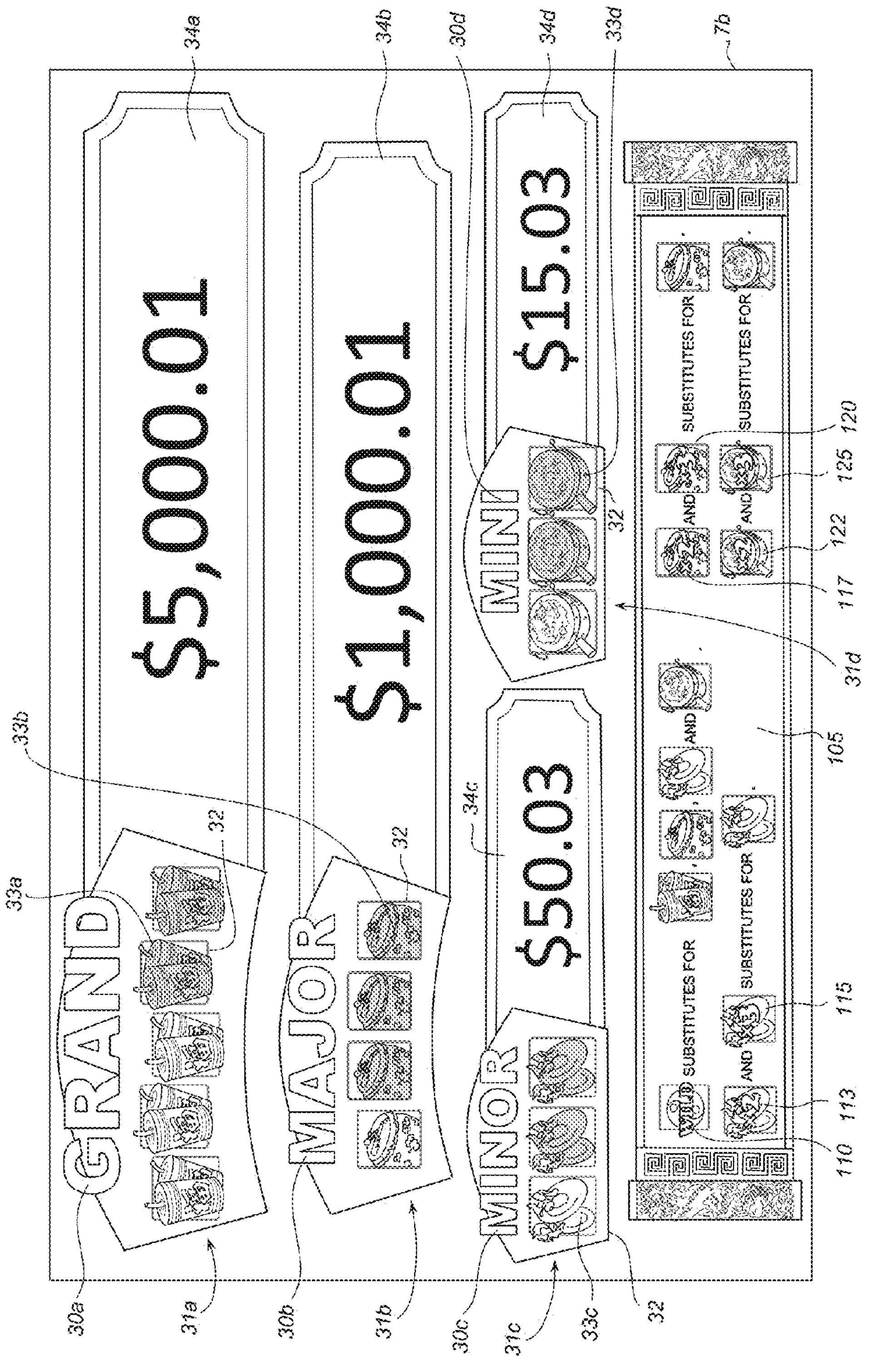

FIGS. 15A and 15B show the jackpot selection prize game 49 after the player has made three selections of banner symbols 100. The selected banner symbols 100 have revealed two firecracker symbols 33*a* and a ying-yang WILD symbol 110, as best shown in FIG. 15A. Consequently, the jackpot meter 31*a* for the grand jackpot 30*a* has been filled by three firecracker symbols 33*a* appearing colour in corresponding symbol positions 32, as best shown in FIG. 15B. As the ying-yang WILD symbol 110 fills up each jackpot meter 31*a* to 31*d*, the jackpot meters 31*b* to 31*d* for the major, minor and mini jackpots 30*b* to 30*d* are filled by one drum symbol 33*b*, one cymbal symbol 33*c* and one rattle symbol 33*d* appearing in colour. The player continues selecting banner symbols 100 until one of the jackpot meters 31*a* to 31*d* is filled in that each symbol position 32 displays a coloured designated game symbol 33, and the player is then awarded the jackpot prize 31*a* to 31*d* corresponding to the filled jackpot meter.

Figure 16A:
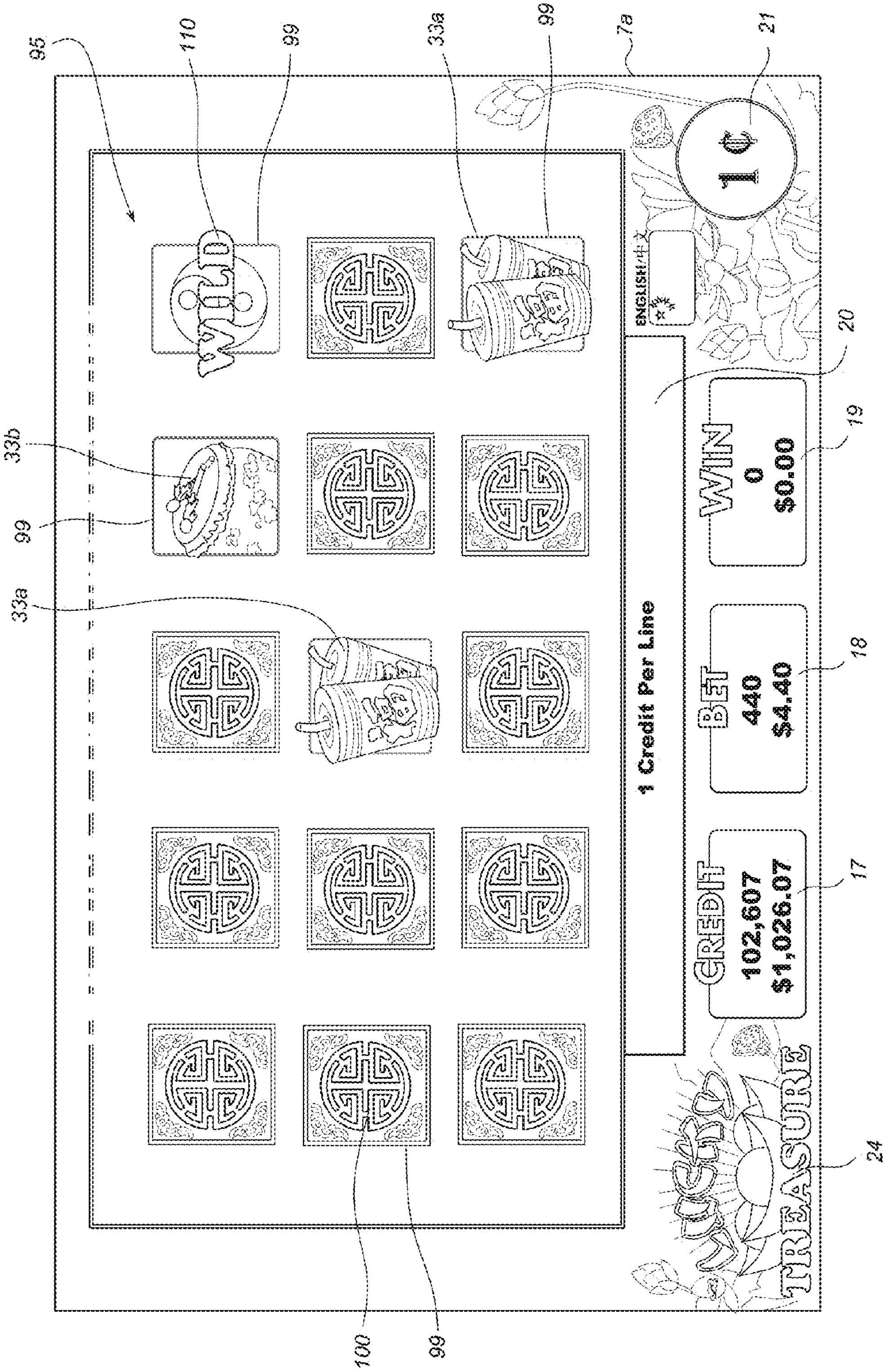
FIGS. 16A and 16B are simulated screen shots of the lower and upper parts, respectively, of the display of the electronic gaming machine of FIG. 1 illustrating the jackpot selection prize game.
Figure 16B:
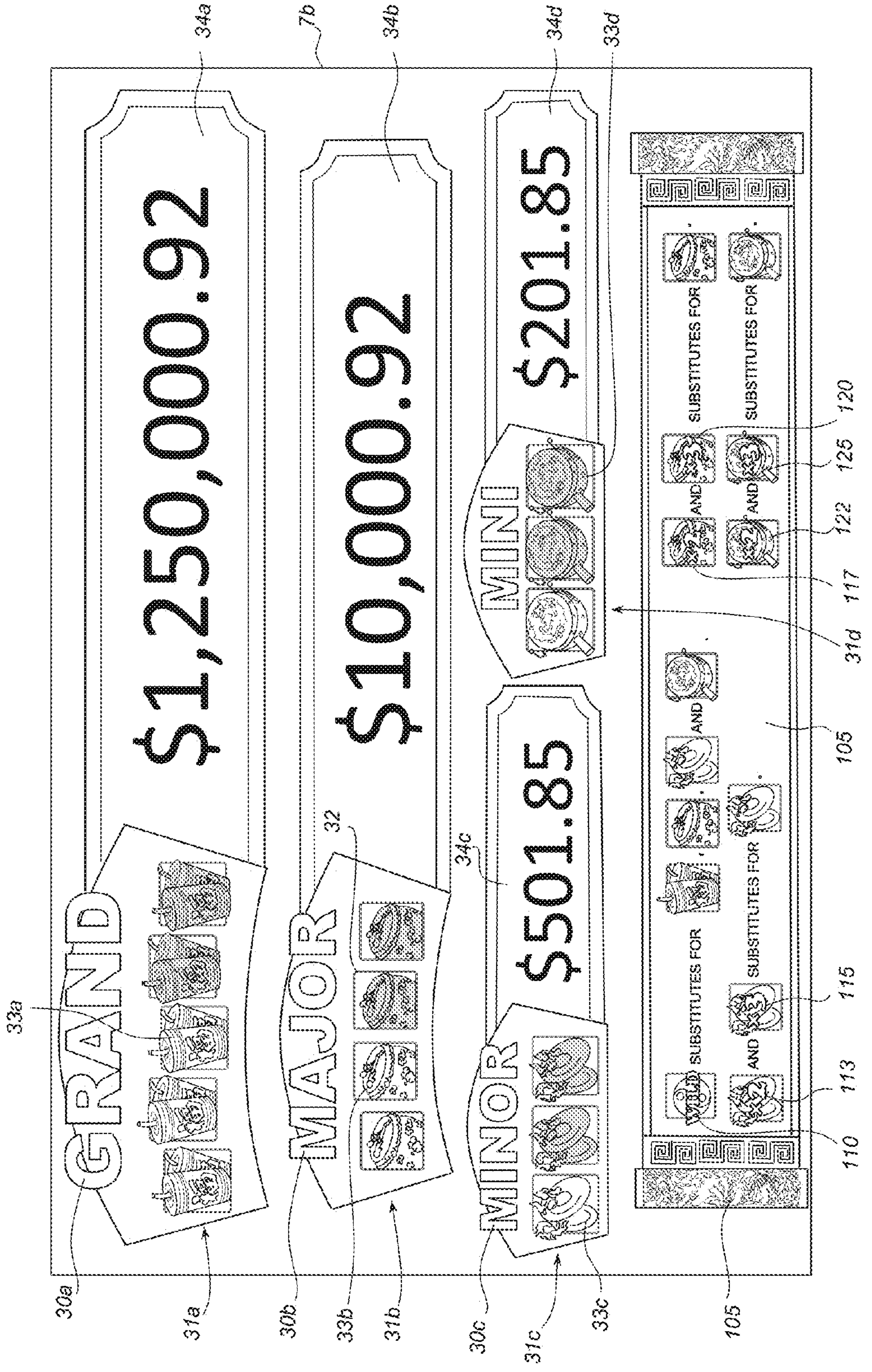
Figure 17:
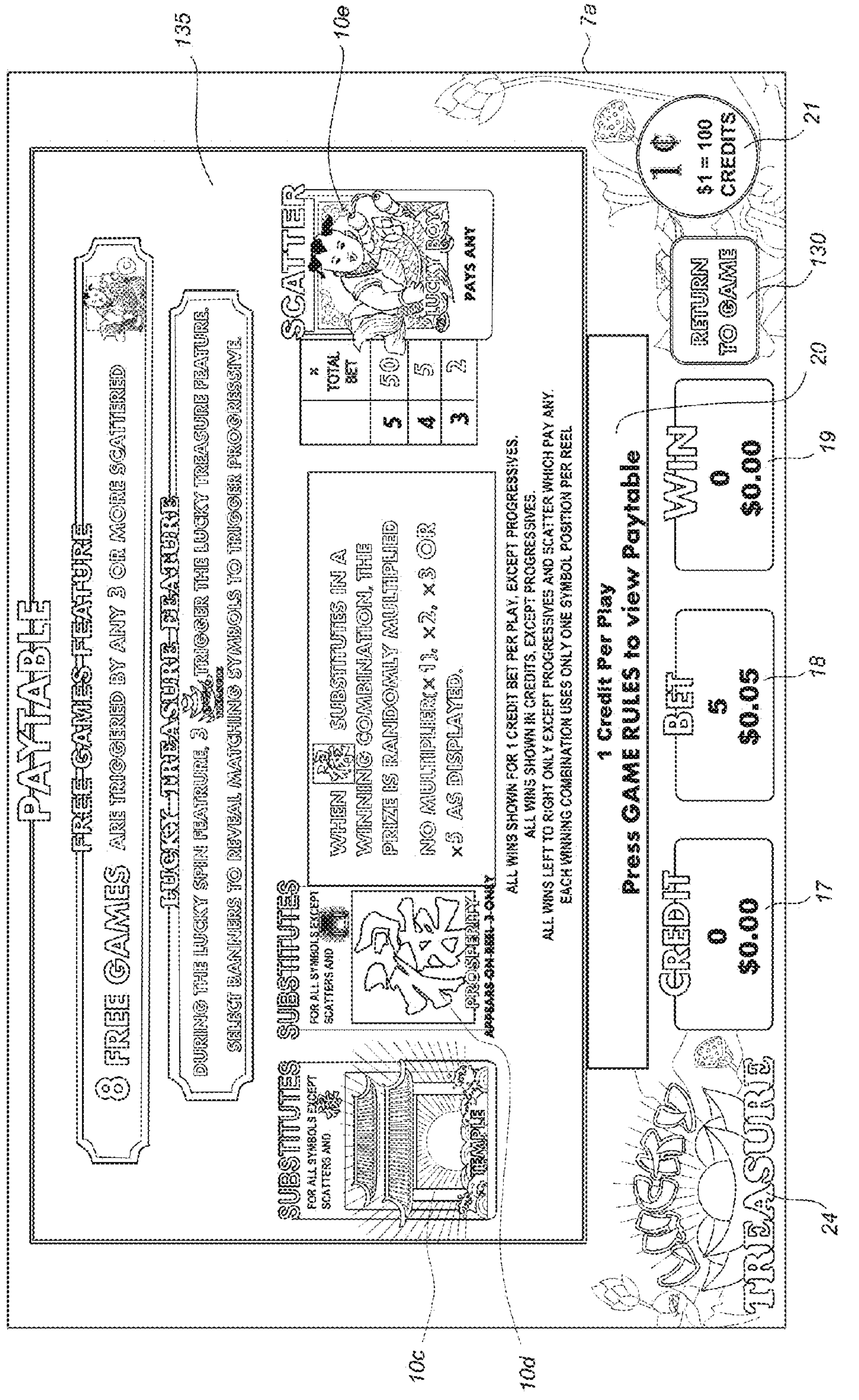
FIGS. 17 to 21 are simulated screen shots of the lower part of the display of the electronic gaming machine of FIG. 1 illustrating the rules for the games.
Figure 18:
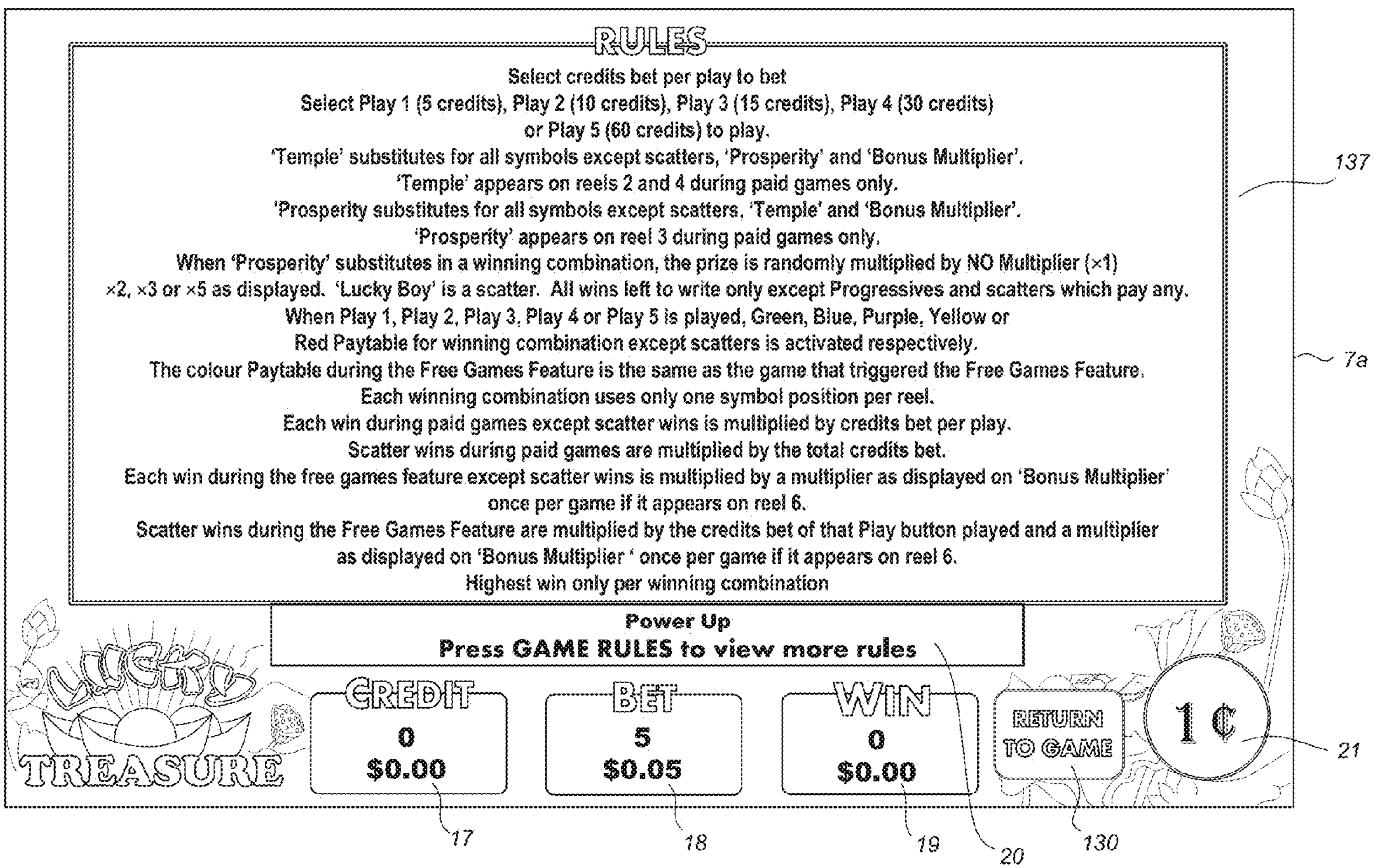
Figure 19:
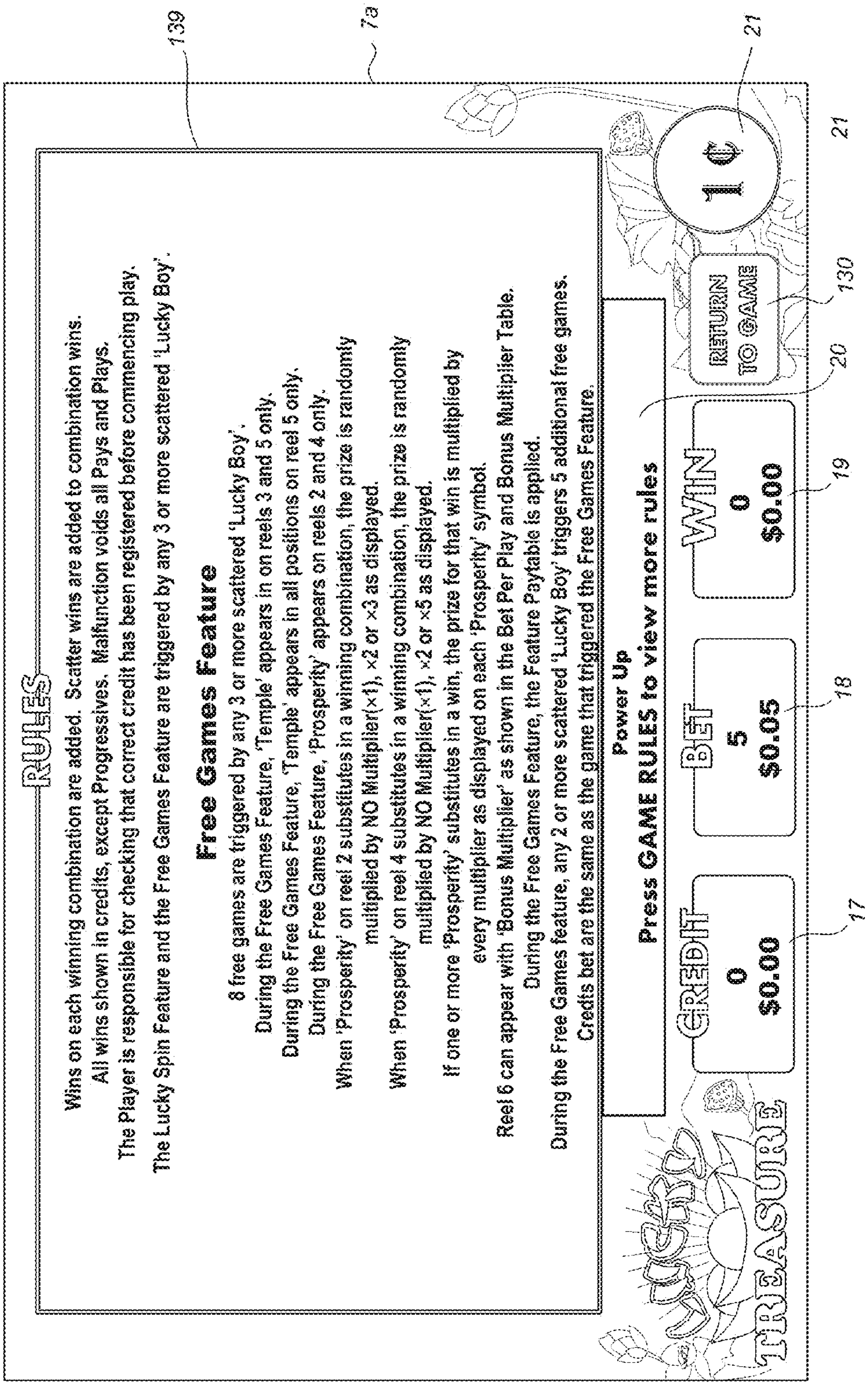
Figure 20:
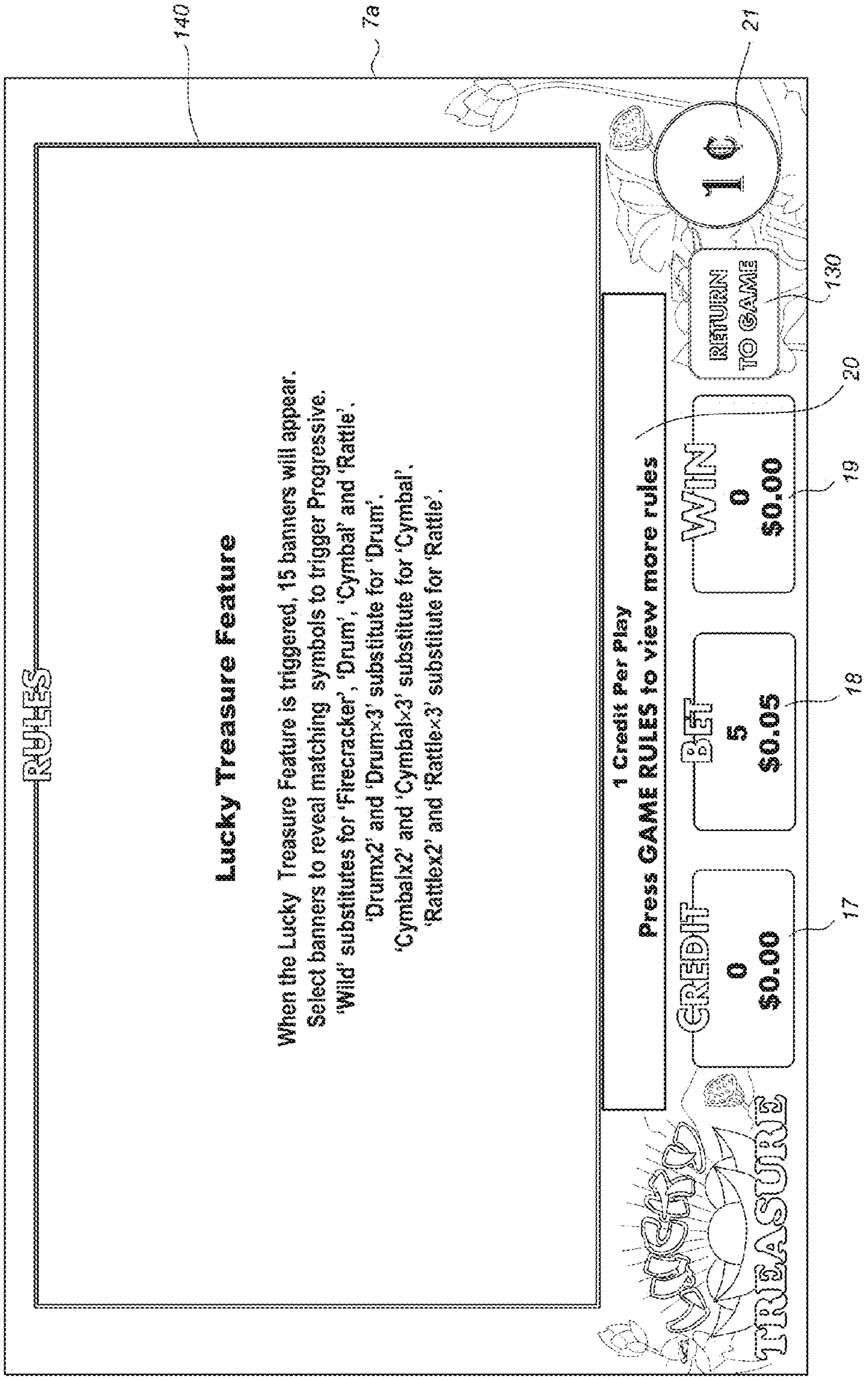
Figure 21:
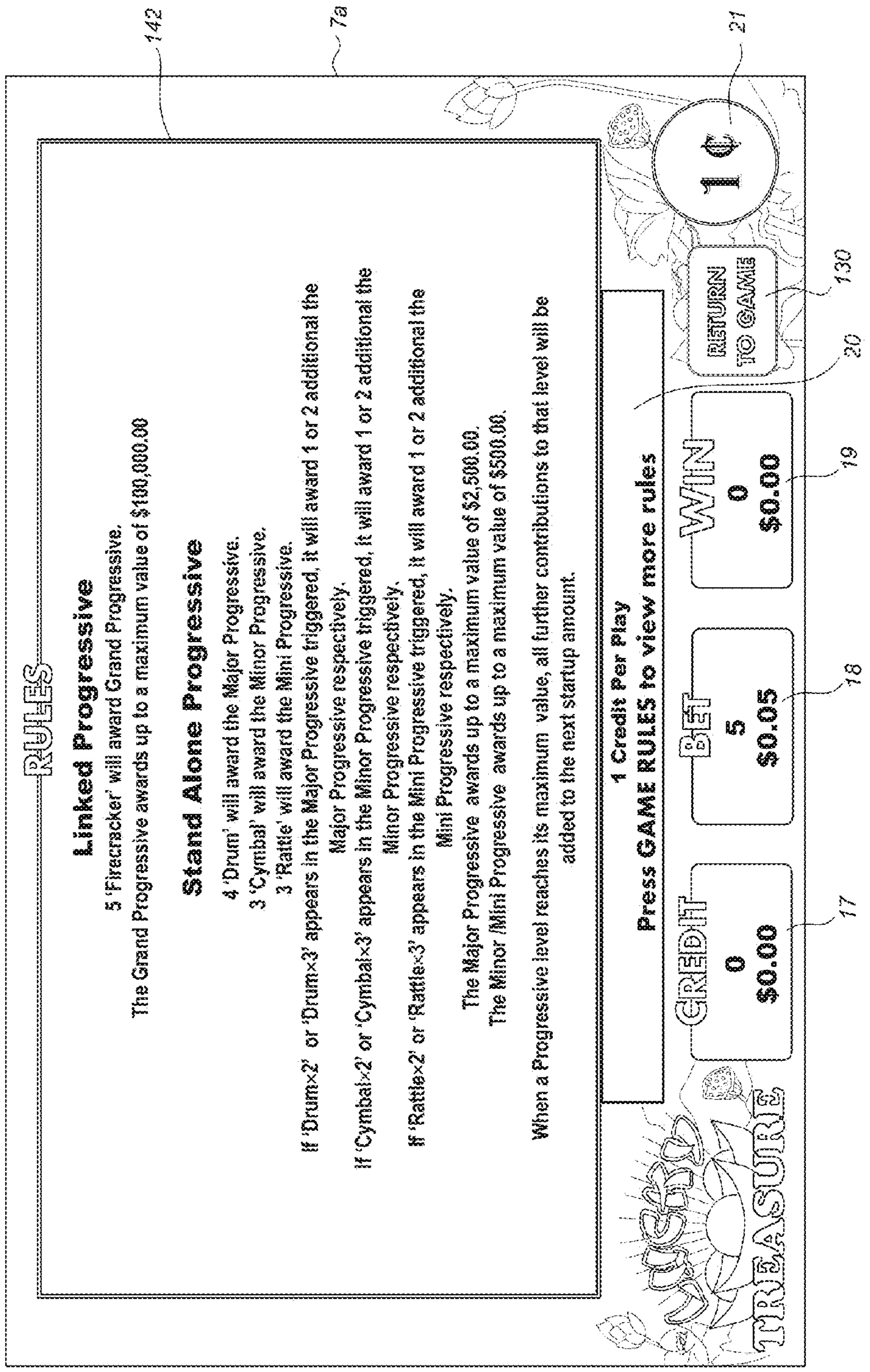

FIGS. 16A and 16B also show another play of the jackpot selection prize game 49 after the player has made four selections of banner symbols 100. There has been a significant increase in the prize boxes 34*a* to 34*d* of each of the jackpots 30*a* to 30*d*, indicating that there has been some time since any of the jackpots have been won. The selected banner symbols 100 have revealed two firecracker symbols 33*a*, a ying-yang WILD symbol 110 and a drum symbol 33*b*, as best shown in FIG. 16A. Again, the jackpot meter 31*a* for the grand jackpot 30*a* has been filled by three firecracker symbols 33*a* appearing colour in corresponding symbol positions 32, as best shown in FIG. 15B. The appearance of the drum symbol 33*b* and the ying-yang WILD symbol 110 means that the jackpot meter 31*b* for the major jackpot 30*b* has been filled by two drum symbols 33*b* appearing in colour. Finally, the ying-yang WILD symbol 110 has caused one cymbal symbol 33*c* and one rattle symbol 33*d* to fill up each jackpot meter 31*c* and 31*d* for the minor and mini jackpots 30*c* and by appearing in colour. Again, the player continues selecting banner symbols 100 until one of the jackpot meters 31*a* to 31*d* is filled in that each symbol position 32 displays a coloured designated game symbol 33, and the player is then awarded the jackpot prize 31*a* to 31*d* corresponding to the filled jackpot meter.

It will be appreciated that the monetary amounts in the prize boxes 34*a* to 34*d* for the jackpots 30*a* to 30*d* are not static but are dynamic in nature. In this embodiment, the jackpots 30 are progressive jackpot prizes in that as the base game 8 is played on the electronic gaming machine 1, a portion of each bet is taken and added to each jackpot 30 to gradually increase the monetary amount displayed in each respective prize box 34 until one of the jackpots 30 is won. This is demonstrated in FIG. 15, where small increases in the value of the jackpots 30 are shown in the prize boxes 34*a* to 34*d*. Once one of the jackpots 30 is won, the relevant jackpot is reset to a base monetary value from which it again increases incrementally as bets are made on the electronic gaming machine 1. In other embodiments, the jackpots 30 are not progressive but increase by a fixed amount after a predetermined amount of playing time has passed.

The rules of the base game 8, feature game 9, bonus game 45 and jackpot prize selection game 49 are available to the player through various rule screens that can be brought by on the lower playing area 7*a* of the video screen 7 by pressing either a designated button from the buttons 6 on the console and/or a virtual button 130 on the touch sensitive part of the video screen 7, as shown in FIGS. 17 to 21. Rule screens 135, 137 and 139 explains the use of the player selectable bet options and the rules for the base game 8, the feature game 9 and bonus game 45. Rule screen 140 explains the rules for the jackpot prize selection game 49 and rule screen 142 explains the rules for awarding the jackpots 30*a* to 30*d*.

While the preferred embodiment has been described in relation to fixed and progressive jackpot-type bonus prizes in relation to a single electronic gaming machine 1, it will be appreciated that the invention is applicable to multiple electronic gaming machines linked together as a gaming system. For example, the jackpots 30 can be progressive bonus prizes that are configured to be part of a wide area or in-house link progressive jackpot. In other words, the progressive jackpot can be awarded on a group of networked electronic gaming machines in a specified area or a group of specified electronic gaming machines that are linked together for jackpot purposes. In this case, there is a central jackpot or bonus prize controller that is in electronic communication with the electronic game controllers 4 of each linked electronic gaming machine 1 that monitors and controls the award of the jackpots 30*a* to 30*d*. However, the individual electronic game controllers 4 would each control the award of the jackpots 30*a* to 30*d* on their respective electronic gaming machines 1 and communicate the award of a jackpot to the central bonus prize controller.

Also, the invention is applicable to electronic gaming machines that provide a plurality of games, so-called multi-game gaming machines. In this instance, there can be one or more jackpot prizes associated with each game. Also, one or more of the jackpot prizes can be shared by two or more games. This can also apply where there is a plurality of electronic gaming machines linked together. That is, one or more jackpot prizes across several or all the linked electronic gaming machines are awarded through the bonus game of chance 45 and its associated jackpot prize selection game 49, and this may occur for only one, some or all of the games offered on each electronic gaming machine 1. In other embodiments, only one of the jackpot prizes is won through the bonus game of chance 45 and its associated jackpot prize selection game 49 to further emphasise that particular jackpot prize, such as the grand jackpot 30*a*. This can be extended to electronic gaming machines 1 linked together.

It will be appreciated that in other embodiments, game enhancing elements can be awarded in the feature game 9 in addition or as an alternative to the prizes awarded based on the coloured pay tables. The award of game enhancing elements can be done by way of the sixth reel 77 or the appearance of game enhancing symbols in the reels 12*a* to 12*e*. A variety of game enhancing elements can be awarded by the game enhancing symbols, including:

i) symbols that award a predetermined number of free plays of said game, such as 8, 10 or 15 free spins or games;
ii) win multiplier symbols that multiply the amount of any win from one of said predetermined winning combinations;
iii) "wild" symbols that cause the display of substitute symbols in randomly selected symbol positions;
iv) bonus symbols that awards a bonus prize, either as a monetary amount or as a bonus credit;
v) wild multiplier symbols that cause the display of substitute symbols on the array 11 and multiplies the amount of any win from one of said predetermined winning combinations;
vi) bonus wild symbols that cause the display of substitute symbols on the array 11 and awards a bonus prize;
vii) symbols that cause the award of additional free plays of said game;
viii) symbols that cause one or more of said symbol positions to be held static (typically one or more reels 12*a* to 12*e*) and display substitute symbols on the array 11;
ix) symbols that cause the same game symbol to be stacked in a group of symbol positions, typically the group being one or more reels 12*a* to 12*e;*
x) symbols that cause the display of new game symbols on the array 11;
xi) "reveal" symbols that cause a game symbol to reveal another game symbol;
xii) "replacement" symbols that cause one or more game symbols to be replaced by other game symbols in the array 11;
xiii) bonus prize of 5× bet, 10× bet or 25× bet (the total amount of the bet or credits bet per pay line);
xiv) all royal card symbols change to wilds (substitute symbols) on reels 12*b*, 12*c* and 12*d* (usually called reels 2, 3 and 4, respectively) of the array 11;
xv) all picture symbols change to wilds on reels 2, 3 and 4 of the array 11;
xvi) all symbols on reels 2 and 4 of the array 11 change to wild symbols; and
xvii) all symbols on reels 12*a* and 12*e* (usually called reels 1 and 5, respectively) of the array 11 change to wild symbols.

These game enhancing symbols do not modify the function or value of the game symbols 10 that appear on the arrays 11, but instead confer bonus prizes, free games or change existing game symbols for other game symbols (such as replacing picture, royal card or symbols belonging to a reel with wild/substitute symbols). Where the function of game symbols 10 have been changed or the game symbols 10 are replaced, then this modification can take effect with the next play of the game instead of applying to the result of the spun array 11. In another embodiment, the game enhancing symbols may indicate the duration in which its game enhancing element is applied, such as a predetermined number of spins or a predetermined time period.

In other embodiments, the game enhancing symbols include "collector"-type game enhancing symbols which award points or tokens. The collection of points or tokens during the base game 8 and/or feature game 9 leads to the trigger of additional prizes or game enhancing symbols, depending on the number of points or tokens that are collected. These additional prizes can include stand alone progressive jackpots, bonus prizes and super games, which are enhanced versions of free spins or games where there are greater pay outs or frequency of wins.

While the same game format can be essentially used across the base game 8 and feature game 9, it will be appreciated that the game format may vary across both the base game and feature game. For example, the feature game 9 could adopt a different format of symbol positions and/or use an entirely different set of game symbols, or a mixture of game symbols from the base game 8 and different game symbols. In another example, the base game 8 may be a wheel-type game or a four reel game and the feature game 9 may be a standard five reel game. Similarly, the base game 8 and feature game 9 may each have different game symbols, game rules and pay tables that are unique to each game. Also, the arrangement of the base game 8 and the feature game 9 is not limited to a set of reels or columns, but could take other forms, such as non-rectangular arrays (i.e. arrays that do not comprise rows and columns). For example, where the array is circular, the predetermined game positions can take the form of pie-shaped slices or wedges.

In another preferred embodiment, there is no need for a trigger event in the form of the appearance of a predetermined number of trigger symbols, such as the Lucky Boy scatter symbols 10*e*. Instead, the electronic game controller 4 can internally determine when to trigger the feature game 9 and/or bonus game 35 in the base game 8. One way to implement this preferred embodiment is for the electronic game controller 4 to internally generate a random number and check if it is a predetermined number or within a predetermined range of numbers that will initiate the appearance of the trigger symbols. For example, the predetermined range of numbers could be the range of numbers between 1 and 10 and the electronic game controller 4 internally generates a random number between 1 and 100. If the generated number is any one of numbers 1 to 10, then this results in the electronic game controller 4 causing the trigger event to occur in the base game 8 and activating the feature game 9 and/or bonus game 45. This random number generation can also be used by the electronic game controller 4 to determine whether the player has won one of jackpots 30*a* to 30*d* in the bonus game of chance 45. This type of trigger for the jackpot or bonus prize is commonly referred to as a mystery jackpot. That is, none of the symbols in the game trigger the jackpot; hence the triggering event is a "mystery".

In other embodiments, the electronic gaming machine 1 also offers the player the opportunity to play in community games against other players in so-called tournament games, or even in player versus player games. This is typically implemented by electronically linking several electronic gaming machines 1 in a group within a gaming venue. The player versus player or tournament game can be played simultaneously by the players or can be staggered, with some players playing at one time and some players playing at another time in the same game. In this situation, the player versus player or tournament game comprises the award of an additional bonus prize in addition to the jackpot prizes.

While one embodiment of the invention has been described in relation to a base game 8 and a feature game 9, it will be appreciated that the invention could include one or more additional feature games that are triggered by specific trigger symbols appearing in the feature game 9. Also, the additional feature games may also have trigger symbols that trigger further feature games in a cascading fashion. These additional and further feature games could have the same game play elements as the feature game 9 or be different feature games entirely.

Furthermore, the embodiments of the invention have been described as providing a standard 5×3 set of reels 12 for the base game 8. However, it will be appreciated that in other embodiments, the size and shape of the reels 12 may vary. For example, the array 11 could take any number of different shapes, such as triangular, circular, square, hexagonal, hemispherical or other polygonal shapes. In another example, where the array is circular, the symbol positions 13 can take the form of pie-shaped slices or wedges. Alternatively, the arrays 11 could have an unequal number of rows and/or columns. For example, the reels 12*a*, 12*b* could have three rows, but the reels 12*c* to 12*e* could have four rows.

Also, in a further embodiment, the player can selectively stop spinning of the reels 12 to increase player interaction and provide the player with an opportunity to guess when a desirable game symbol may appear in a symbol position 13. Furthermore, the player can start spinning of the reels 12 to further enhance player interaction.

In other embodiments, the base game 8 (and the feature game) need not be displayed on a single video screen 7. Instead, they may be displayed on separate video screens, with the lower playing area 7*a* appearing in a lower video screen and the upper display area 7*b* on an upper video screen. Also, the order can be reversed, with the playing area 7*a* appearing on an upper video screen or upper part of a single video display screen 7 and the information usually displayed on the upper display area 7*b* appearing on a lower video screen or lower part of a single video display screen.

In another embodiment, the video screen 7 is a touch screen for use in addition to the player-actuatable buttons 6 so as to enable the player to select the bet level (such as bet denominations or bet per pay line 14) as well as other various features, such as making monetary bets for the game, initiating play of any base and feature games played and responding to any messages or requests issued on the electronic gaming machine 1 by the electronic game controller 4. In this case, the player may control when the reels 12 start spinning and stop spinning, either individually or collectively, by simply touching the reels 12. Control over spinning of the reels 12 can also be implemented through the buttons 6 on the console 3. This increases player interaction and provide the player with an opportunity to guess when a particular game symbol 10 may appear in the reels 12.

Figure 22:
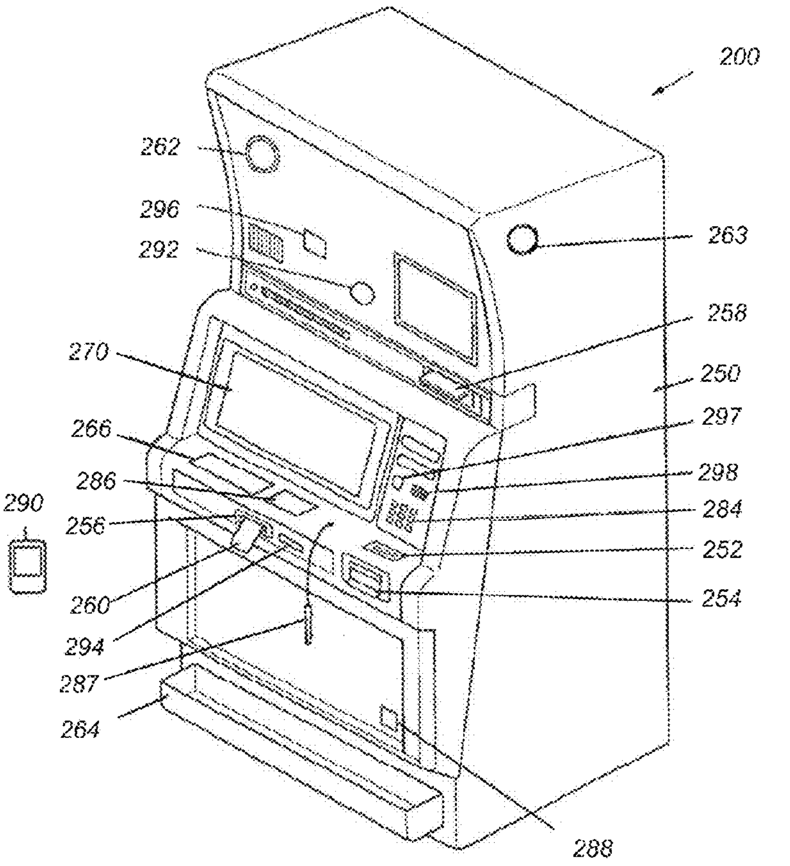
FIG. 22 is a perspective view of an electronic gaming machine according to yet another embodiment of the invention.

Referring to FIG. 22, another embodiment of the invention is shown in the form of an electronic gaming machine 200. The electronic gaming machine 200 may include a housing or cabinet 250 and one or more value transfer mechanisms or devices, which may include a coin slot or acceptor 252, a paper currency or bill acceptor 254, a ticket reader/printer 256 and a card reader 258, which may be used to input value to the electronic gaming machine 200. A value transfer device may include any device that can accept value from a player. The topper (not shown) may be mounted to the top of the electronic gaming machine 200.

If provided on the electronic gaming machine 200, the ticket reader/printer 256 may be used to read and/or print or otherwise encode ticket vouchers 260. The ticket vouchers 260 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 260 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 260 could be printed with an optically readable material such as ink, or data on the ticket vouchers 260 could be magnetically encoded. The ticket reader/printer 256 may be provided with the ability to both read and print ticket vouchers 260, or it may be provided with the ability to only read or only print or encode ticket vouchers 260. In the latter case, for example, some of the electronic gaming machines 200 may have ticket printers 256 that may be used to print ticket vouchers 260, which could then be used by a player in other electronic gaming machines 200 that have ticket readers 256.

If provided, the card reader 258 may include any type of card reading device, such as a magnetic card reader or an optical card reader, and may be used to read data from a card offered by a player, such as a credit card or a player tracking card. If provided for player tracking purposes, the card reader 258 may be used to read data from, and/or write data to, player tracking cards that are capable of storing data representing the identity of a player, the identity of a casino, the players gaming habits, etc.

The electronic gaming machine 200 may include one or more audio speakers 262, a coin payout tray 264, an input control panel 266, and a colour video display unit 270 for displaying images relating to the game or games provided by the electronic gaming machine 200. The audio speakers 262 may generate audio representing sounds such as the noise of spinning reels, a dealers voice, music, announcements or any other audio related to a game. The input control panel 266 may be provided with a plurality of pushbuttons or touch-sensitive areas that may be pressed by a player to select games, make wagers, make gaming decisions, etc.

Figure 23:
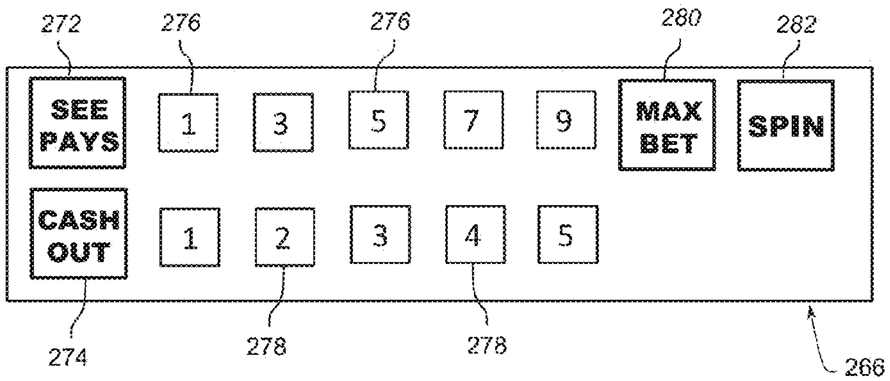
FIG. 23 is a schematic drawing of a control panel for the electronic gaming machine of FIG. 22.

FIG. 23 illustrates one possible embodiment of the control panel 266, which may be used where the electronic gaming machine 200 having a plurality of reels. The control panel 266 may include a "See Pays" button 272 that, when activated, causes the display unit 270 to generate one or more display screens showing the odds or payout information for the game or games provided by the electronic gaming machine 200. As used herein, the term "button" is intended to encompass any device that allows a player to make an input, such as an input device that must be depressed to make an input selection or a display area that a player may simply touch. The control panel 266 may include a "Cash Out" button 274 that may be activated when a player decides to terminate play on the electronic gaming machine 200, in which case the electronic gaming machine 200 may return value to the player, such as by returning a number of coins to the player via the payout tray 264.

The control panel 266 may be provided with a plurality of selection buttons 276, each of which allows the player to select a different number of pay lines prior to spinning the reels. For example, five buttons 276 may be provided, each of which may allow a player to select one, three, five, seven or nine pay lines.

The control panel 266 may also be provided with a plurality of selection buttons 78 each of which allows a player to specify a wager amount for each pay line selected. For example, the electronic gaming machine 200 may be provided with five selection buttons 78, each of which may allow a player to select 1¢, 2¢, 5¢, 10¢ and 20¢, to wager for each pay line selected. In that case, if a player were to activate one of the buttons 276 to select five pay lines and then activate one of the buttons 278 to select 5¢ per pay line to be wagered or bet, the total wager would be $0.25.

The control panel 266 may include a "Max Bet" button 280 to allow a player to make the maximum wager allowable for a game. In the above example, where up to nine pay lines were provided and up to 20¢ could be wagered for each pay line selected, the maximum wager would be $1.80 The control panel 266 may include a spin button 282 to allow the player to initiate spinning of the reels after a bet has been made.

In FIG. 23, a rectangle is shown around the buttons 272, 274, 276, 278, 280, 282. It should be understood that the rectangle simply designates, for ease of reference, an area in which the buttons 272, 274, 276, 278, 280, 282 may be located. Consequently, the term "control panel" should not be construed to imply that a panel or plate separate from the housing 250 of the electronic gaming machine 200 is required, and the term "control panel" may encompass a plurality or grouping of player activatable buttons.

Although one possible control panel 266 is described above, it should be understood that different buttons could be utilized in the control panel 266, and that the particular buttons used may depend on the game or games that could be played on the electronic gaming machine 200. Although the control panel 266 is shown to be separate from the display unit 270, it should be understood that the control panel 266 could be generated by the display unit 270. In that case, each of the buttons of the control panel 266 could be a coloured area generated by the display unit 270, and some type of mechanism may be associated with the display unit 270 to detect when each of the buttons was touched, such as a touch-sensitive screen.

As noted above, the electronic gaming machine 200 may include a mechanism by which the electronic gaming machine 200 may determine the identity of the player. In particular, the card reader 258 may be used to read a card that carries an identification code that may be uniquely associated with the player so that the gaming unit can differentiate that player from all other players, or so that the gaming unit can differentiate that player as a member of a group of players from all player not a member of the group of players. The electronic gaming machine 200 may also include equipment, such as a keypad 284, an input pad 286 (with optional stylus 287), a port (or antenna) 288 adapted to communicate via a wired or wireless link (infrared or radio frequency link, for example) to a mobile electronic device 290 (such as a personal digital assistant, smart phone or tablet), a camera 292, a scanner 294, a retinal (or iris) scanner 296, fingerprint scanner 297, and/or a microphone 298. The electronic gaming machine 200 may include any one of the devices 258, 284, 286, 288, 290, 292, 294, 296, 297, 298, or the electronic gaming machine 200 may include a combination of some or all of the devices 258, 284, 286, 287, 288, 290, 292, 294, 296, 297, 298.

In operation, a player may identify him or herself to the electronic gaming machine 200 by entering a unique numeric or alpha-numeric code using the key pad 284, for example. Alternatively, the player may use his or her finger or the stylus 287 to sign his or her signature on the input pad 286. As a further alternative, the player may sign his or her signature on the mobile electronic device 290, which signature is then converted to electronic data, and the data is then transferred via the port/antenna 288 to the electronic gaming machine 200. As yet another alternative, the player may sign his or her signature on a piece of paper that is then photographed using the camera 292 or scanned using the scanner 294 (or the bill acceptor 254) to convert the signature into electronic data. As an additional alternative, the player may place one of his or her fingers or his or her hand on the scanner 297, and the scanner 297 may generate an electronic data representation of the fingerprint on one or more of the player's fingers or an electronic data representation of the pattern of the entire hand. Alternatively, the camera 292 may be used to take a picture (live or still) of the player, the picture then being converted into electronic data. As a still further alternative, the player may place his or her eye up to the retinal (or iris) scanner 296, and the retinal (or iris) scanner 296 may generate an electronic data representation corresponding to the pattern of the retina (or iris) of the player. As yet another alternative, the player may speak into the microphone 298, and characteristics of the spoken words (or voiceprint) may be converted into an electronic data representation.

Figure 24:
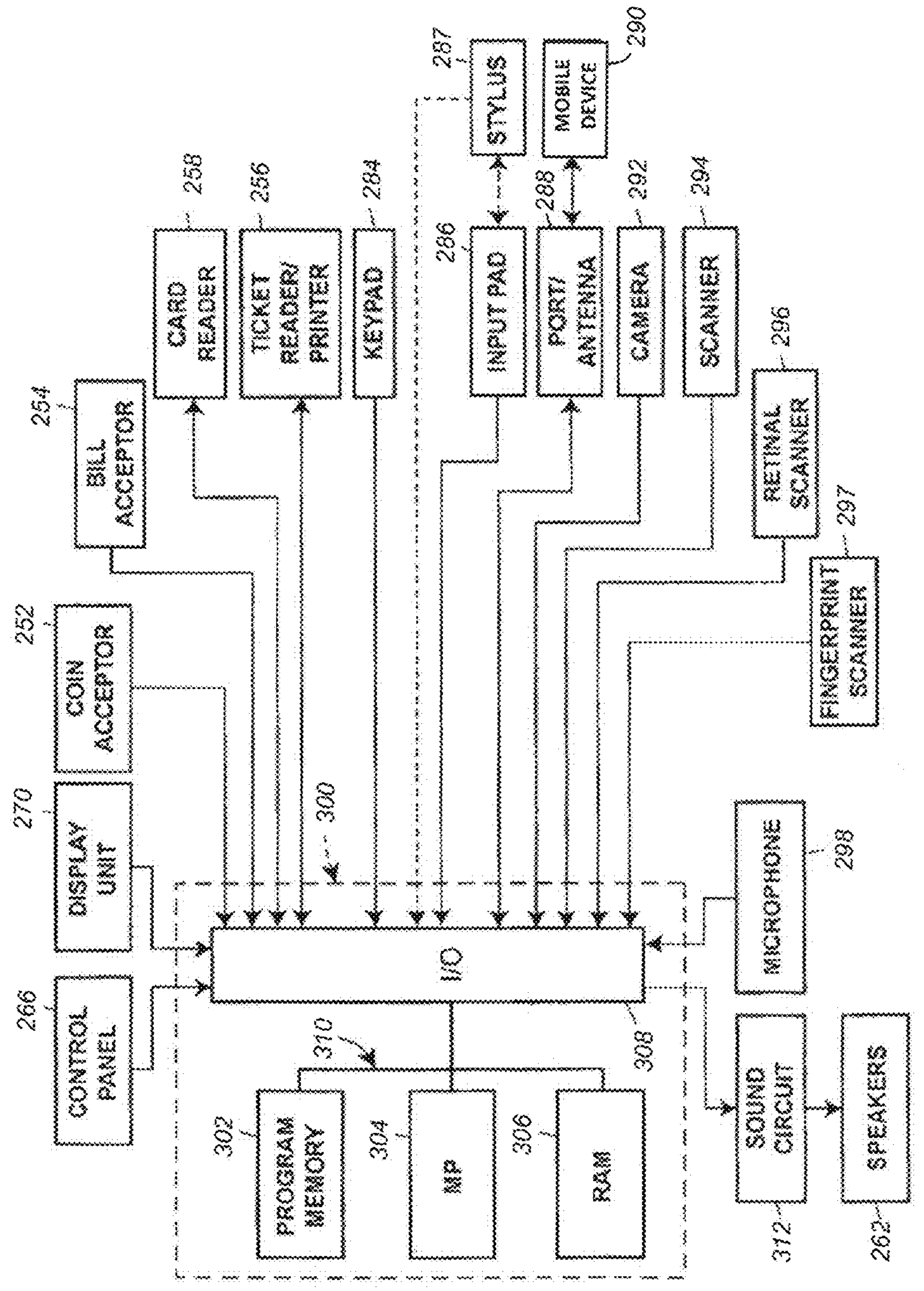
FIG. 24 is a block diagram of the electronic components of the electronic gaming machine of FIG. 22.

FIG. 24 is a block diagram of a number of components that may be incorporated in the electronic gaming machine 200. Referring to FIG. 24, the electronic gaming machine 200 may include a controller 300 that may comprise a program memory 302, a microcontroller or microprocessor (MP) 304, a random-access memory (RAM) 306 and an input/output (I/O) circuit 308, all of which may be interconnected via an address/data bus 310. It should be appreciated that although only one microprocessor 304 is shown, the controller 300 may include multiple microprocessors 304. Similarly, the memory of the controller 300 may include multiple RAMs 306 and multiple program memories 302. Although the I/O circuit 108 is shown as a single block, it should be appreciated that the I/O circuit 308 may include a number of different types of I/O circuits. The RAM(s) 304 and program memories 302 may be implemented as semiconductor memories, magnetically readable memories, and/or optically readable memories, for example.

FIG. 24 illustrates that the coin acceptor 252, the bill acceptor 254, the ticket reader/printer 256, the card reader 258, the control panel 266, the display unit 270, the keypad 284, the input pad 286 (and optionally the stylus 287), the port/antenna 288, the digital camera 292, the scanner 294, the retinal scanner 296, the fingerprint scanner 297 and the microphone 298 may be operatively coupled to the I/O circuit 308, each of those components being so coupled by either a unidirectional or bidirectional, single-line or multiple-line data link, which may depend on the design of the component that is used. The speaker(s) 262 may be operatively coupled to a sound circuit 312, that may comprise a voice- and sound-synthesis circuit or that may comprise a driver circuit. The sound-generating circuit 312 may be coupled to the I/O circuit 308.

As shown in FIG. 24, the components 252, 254, 256, 258, 266, 270, 284, 286, 287, 288, 292, 294, 296, 297, 298, 312 may be connected to the I/O circuit 308 via a respective direct line or conductor. Different connection schemes could be used. For example, one or more of the components shown in FIG. 12 may be connected to the I/O circuit 308 via a common bus or other data link that is shared by a number of components. Furthermore, some of the components may be directly connected to the microprocessor 304 without passing through the I/O circuit 308.

It will be appreciated that while the preferred embodiments have been described in relation to an industry standard electronic gaming machine, the invention can be readily applied to other types of electronic gaming machines, including a personal computer (standing alone or connected to a communications network, LAN or WAN), mobile electronic devices (such as handheld or portable electronic devices like tablets and smart phones) and other electronic devices capable of displaying a game. In the case of mobile electronic device, in one arrangement it may permit the player to make bets using "virtual" credits that represent a monetary value, but do not require the player to make a monetary transaction. Instead, the invention may provide a tiered access to the various features of the game so that the player can make relatively small payments to access particular features of the game or obtain additional benefits during game play. An alternative arrangement would require the player to purchase virtual credits or tokens via an interface on the mobile electronic device or an online interface accessible by the mobile electronic device. Similarly, either of the above described arrangements can be applied where the invention is implemented on a personal computer (PC) connected to the internet (wirelessly or not). In one example of the implementation, the PC would access an online casino over the internet to play the game of the invention or the game of the invention would be part of a social networking website. It is also contemplated that the player could also make regular payments to subscribe to continue playing the game on the mobile electronic device, PC or other electronic device.

In an alternative embodiment, the electronic gaming machine also provides an option for the player to play with either credits based on a monetary amount or virtual credits as discussed above. This can be implemented by way of a selection menu prior to playing the selected game or by providing a suitable menu button on screen during play of the selected game.

In another aspect, the invention includes a computer programme configured to perform the invention. In this way the invention can be implemented in various ways on an electronic gaming machine. In a further aspect, the invention includes a gaming system configured comprising a central processing unit (such as a computer or computational processor) configured for communication with an electronic gaming machine to perform the invention. In a yet another aspect, the invention includes a non-transitory computer readable or carrier medium carrying computer executable code that, when executed on a central processing unit configured for communication with an electronic gaming machine, causes said central processing unit to perform the invention. In this case, the non-transitory carrier medium includes an external hard drive, a memory device, including a memory card, smart card, a radio frequency identification (RFID) device, USB key, magnetic card or other electronic storage device.

It will further be appreciated that any of the features in the preferred embodiments of the invention can be combined together and are not necessarily applied in isolation from each other. For example, the feature of the player being able to selectively starting or stopping spinning of the reels 12 and the feature of providing separate video screens for the lower playing area 7*a* and upper display area 7*b* can be combined into a single electronic gaming machine 1. Similar combinations of two or more features from the above described embodiments or embodiments of the invention can be readily made by one skilled in the art.

By providing the player with the ability to effectively choose the probability of triggering the bonus game and/or feature game based on a selected bet level, the invention introduces a variety in game play and game mechanics to the player, thus increasing the player's excitement and retaining his or her interest in playing the same electronic gaming machine. Also, by linking the selected bet level to pay tables of increasing value, the invention further increases the player's interest and participation in the electronic gaming machine as the player sees a direct connection between the selected bet level and the expected pay outs for winning combinations and jackpot prizes. The invention also adds greater value to the player in terms of providing a greater reward to increasing the bet level as the amount of prizes for winning combinations, probability of winning a jackpot or bonus prize and the probabilities of triggering the bonus game and/or feature game also increases, compared to a conventional electronic gaming machine. All these advantages of the invention result in the player being more likely to retain interest in continuing to play the same electronic gaming machine due to the variation in the game play on the electronic gaming machine. Furthermore, since the electronic game controller controls operation of the electronic gaming machine, the invention can be readily implemented to existing gaming machines and other gaming systems. In all these respects, the invention represents a practical and commercially significant improvement over the prior art.

Although the invention has been described with reference to specific examples, it will be appreciated by those skilled in the art that the invention may be embodied in many other forms.

The invention claimed is:

1. An electronic gaming machine comprising:

a display for displaying game symbols for playing a game of chance, wherein said game of chance comprises randomly displaying said game symbols in a plurality of reels and awarding prizes to a player for predetermined winning combinations of game symbols appearing on said reels;

an electronic game controller in electronic communication with said display for controlling the appearance of said game symbols in said game of chance on the display; and a value transfer mechanism for receiving value from a player to make a bet and initiate play of said game of chance on said display, the value transfer mechanism including at least one of a coin acceptor, a paper currency acceptor and a ticket reader;

wherein said electronic game controller in response to said player making said bet via said value transfer mechanism commences play of said game of chance;

wherein said electronic game controller assigns a number of special symbols to one or more reel strips associated with said reels, said number of special symbols being variable and dependent on a first bet value selected by said player; and wherein the appearance of at least two special symbols in said game of chance causes said electronic game controller to activate a bonus game of chance comprising the award of at least one said bonus prize by said electronic game controller in response to a predetermined outcome of said bonus game of chance.

2. The electronic gaming machine of claim 1, wherein there is a plurality of selectable bet options selectable by said player, said selectable bet options corresponding to different first bet values, and the probability of activating said bonus game of chance increases proportionally between two of said selectable bet options.

3. The electronic gaming machine of claim 2, wherein each said selectable bet option is associated with a pay table for determining the values of prizes awarded in response to said predetermined winning combinations of game symbols, a value for at least one prize in the pay table of one selectable bet option being greater than the value for said at least one prize in the pay table of another selectable bet option.

4. The electronic gaming machine of claim 3, wherein a value for at least one prize in the pay table of one said selectable bet option is a linear increase of the value for said at least one prize in the pay table of said another selectable bet option.

5. The electronic gaming machine of claim 3, wherein a value for at least one prize in the pay table of one said selectable bet option is a non-linear increase of the value for each prize in the pay table of said another selectable bet option.

6. The electronic gaming machine of claim 3, wherein said at least one prize comprises each of the prizes in the pay tables of one said selectable bet option and said another selectable bet option.

7. The electronic gaming machine of claim 3, the value for each prize in the pay table of said one selectable bet option is greater than the value for the same prize in the pay table of said another selectable bet option.

8. The electronic gaming machine of claim 7, wherein the value for each prize in the pay table of said one selectable bet option is a linear increase of the value for the same prize in the pay table of said another selectable bet option.

9. The electronic gaming machine of claim 7, wherein the value for each prize in the pay table of said one selectable bet option is a non-linear increase of the value for the same prize in the pay table of said another selectable bet option.

10. The electronic gaming machine of claim 1, wherein said electronic game controller causes a meter to be shown on said display, said meter indicating a number associated with a total number of said special symbols currently assigned to said reel strips.

11. The electronic gaming machine of claim 1, wherein said electronic game controller causes a dynamic graphical image to be shown on said display, said dynamic graphical image indicating the probability of activating said bonus game of chance.

12. The electronic gaming machine of claim 1, wherein said electronic game controller awards a multiplier that increases the value of said prizes in response to the appearance of a multiplier symbol, said multiplier symbol being randomly selected from a range of multiplier symbols having different multiplier values, said range of multiplier symbols being dependent on a second bet value selected by said player.

13. The electronic gaming machine of claim 12, wherein said second bet value is different to said first bet value.

14. The electronic gaming machine of claim 13, wherein said first bet value and said second bet value are combined to represent the total bet made by said player.

15. The electronic gaming machine of claim 12, wherein said multiplier values of said multiplier symbols in said range increase as the selected second bet value increases.

16. The electronic gaming machine of claim 1, wherein one or more jackpot meters are shown on said display, said one or more jackpot meters being associated with the award of one or more jackpots.

17. The electronic gaming machine of claim 16, wherein at least one jackpot meter displays designated game symbols as they appear in said game of chance.

18. The electronic gaming machine of claim 17, wherein said at least one jackpot meter comprises a jackpot meter array of symbol positions, wherein said designated game symbols are displayed in the symbol positions of said jackpot meter array.

19. The electronic gaming machine of claim 18, wherein the jackpot associated with said at least one jackpot meter is awarded when said at least one jackpot meter displays said designated game symbol in each symbol position of said jackpot meter array.

20. The electronic gaming machine of claim 17, wherein said bonus game of chance is associated with said one or more jackpot meters, said bonus game of chance comprises a bonus array of selectable symbol positions, wherein selection of a symbol position by said player reveals a game symbol or said designated game symbol and said at least one jackpot meter increases for each revealed designated game symbol.

21. The electronic gaming machine of claim 20, wherein said at least one jackpot meter comprises a jackpot meter array of symbol positions, said designated game symbols being displayed in the symbol positions of said jackpot meter array and wherein said at least one jackpot meter increases by displaying said revealed designated game symbol in a symbol position of said jackpot meter array.

22. The electronic gaming machine of claim 1, wherein a feature game of chance is activated by a trigger event in said game of chance, said feature game of chance being played prior to playing the bonus game of chance.

23. The electronic gaming machine of claim 22, wherein said feature game of chance is activated by the appearance of said at least two special symbols in said game of chance.

* * * * *